US012623908B2

(12) United States Patent
Abdulkhair et al.

(10) Patent No.: US 12,623,908 B2
(45) Date of Patent: May 12, 2026

(54) ACTIVATED CARBON DOPED FOR BISMUTH OXY-IODIDE-BASED NANOCOMPOSITES

(71) Applicant: IMAM MOHAMMAD IBN SAUD ISLAMIC UNIVERSITY, Riyadh (SA)

(72) Inventors: Babiker yagoub Elhadi Abdulkhair, Riyadh (SA); Mohamed Khairy Omran, Riyadh (SA); Faisal K. Algethami, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 18/909,490

(22) Filed: Oct. 8, 2024

(65) Prior Publication Data

US 2026/0097967 A1     Apr. 9, 2026

(51) Int. Cl.
| | |
|---|---|
| *C01B 32/318* | (2017.01) |
| *B82Y 30/00* | (2011.01) |
| *B82Y 40/00* | (2011.01) |
| *C01G 29/00* | (2006.01) |

(52) U.S. Cl.
CPC ............ *C01B 32/318* (2017.08); *B82Y 30/00* (2013.01); *B82Y 40/00* (2013.01); *C01G 29/00* (2013.01)

(58) Field of Classification Search
None
See application file for complete search history.

(56) References Cited

U.S. PATENT DOCUMENTS

2018/0008953 A1*    1/2018   Jiang ................... B01J 20/0259

FOREIGN PATENT DOCUMENTS

| CN | 103861621 A | 6/2014 |
|---|---|---|
| CN | 107876073 A | 4/2018 |
| CN | 115845801 A | 3/2023 |
| CN | 117205948 A | 12/2023 |

OTHER PUBLICATIONS

Fung et al.; Raman Scattering and Electrical Conductivity in Highly Disordered Activated Carbon Fibers; J. Mater. Res., vol. 8, No. 3, Mar. 1993.*

(Continued)

*Primary Examiner* — Guinever S Gregorio

(74) *Attorney, Agent, or Firm* — Oblon, McClelland, Maier & Neustadt, L.L.P.

(57)     ABSTRACT

Aspects of the present disclosure are directed towards a method for producing an activated carbon/bismuth oxy-iodide nanocomposite. The method includes heating a glycol solution including $Bi(NO_3)_3 \cdot 5H_2O$ and activated carbon to 100° C. The method includes heating a glycol solution includes potassium iodide to 100° C. The method includes adding the glycol solution including $Bi(NO_3)_3 \cdot 5H_2O$ and activated carbon and the glycol solution including potassium iodide to a reaction vessel including a solvent to form a reaction mixture. The method includes chilling the reaction mixture to ambient temperature. The method includes filtering the reaction mixture to obtain the activated carbon/bismuth oxy-iodide nanocomposite.

20 Claims, 23 Drawing Sheets

(56) References Cited

OTHER PUBLICATIONS

Hou et al.; Journal of Colloid and Interface Science; vol. 398, pp. 161-167; May 15, 2013.*

YuanYou Wang, et al., "Facile one-step solvothermal synthesis of active carbon/BiOl microspheres with enhanced visible light-driven photocatalytic activity in the reduction of Cr(VI)", Royal Society of Chemistry, RSC Advances, vol. 8, Feb. 16. 2018, pp. 7518-7522.

Run-Qing Miao et al., "Activated carbon-boosted BiOl in CO2 adsorption and electron transfer for photothermally catalyzed CO2 oxidative dehydrogenation of propane", Chemical Engineering Journal, vol. 481, Feb. 1, 2024, 148293, 5 pages.

* cited by examiner

ACTIVATED CARBON DOPED FOR BISMUTH OXY-IODIDE-BASED NANOCOMPOSITES

STATEMENT REGARDING PRIOR DISCLOSURE BY THE INVENTORS

Aspects of the present disclosure are described in Khairy, M., et. al, "Enhancing the Conductivity and Dielectric Characteristics of Bismuth Oxyiodide via Activated Carbon Doping" Molecules, Issue 29, 2024, which is incorporated herein by reference in its entirety.

BACKGROUND

Technical Field

The present disclosure is directed to a nanocomposite, particularly to a method of synthesis of activated carbon/BiOI (bismuth oxy-iodide) nanocomposites for enhancement of electrical properties.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

Innovative metal oxide-carbon hybrid materials have garnered interest and find use in several fields, such as electronics, energy storage devices, solid-state gas sensors, gas and liquid adsorption, photocatalysis, heterogeneous catalysis, and solar cells. Activated carbon (AcC) has extraordinary unique characteristics and excellent surface properties, including pore size, structure, surface area, and chemical and thermal stability. These factors made AcC a plausible candidate for gas separation, water treatment, electrode material, supercapacitors, and lithium-ion batteries. Moreover, the electrochemical performance of carbon-based electrocatalysts is mainly determined by the characteristics of the carbon support, particularly its electrical conductivity. Several metal oxide ($TiO_2$, $Fe_2O_3$, ZnO, $WO_3$, and $SnO_2$) supported nanoparticles on AcC also may encompass metal hydroxides and oxyhydroxides $Ni(OH)_2$, and $\alpha$-FeO(OH), and metals (Pt, Au, and Ag) [See: Huang, Q.; Wang, X.; Li, J.; Dai, C.; Gamboa, S.; Sebastian, P. Nickel hydroxide/activated carbon composite electrodes for electrochemical capacitors. *J. Power Sources* 2007, 164, 425-429; and Roosta, M.; Ghaedi, M.; Mohammadi, M. Removal of Alizarin Red S by gold nanoparticles loaded on activated carbon combined with ultrasound device: Optimization by experimental design methodology. *Powder Technol.* 2014, 267, 134-144]. Recent articles provided diverse preparations and uses of metal oxides supported on carbonaceous materials [See: Barroso-Bogeat, A.; Fernández-González, C.; Alexandre-Franco, M.; Gómez-Serrano, V. Activated carbon as a metal oxide support: A review. In *Activated Carbon: Classifications, Properties and Applications*; Nova Science Publishers: New York, NY, USA, 2011; pp. 297-318; and Algethami, F. K.; Elamin, M. R.; Abdulkhair, B. Y.; Al-Zharani, M.; Qarah, N. A.; Alghamdi, M. A. Fast fabrication of bismuth oxyiodide/carbon-nanofibers composites for efficient anti-proliferation of liver and breast cancer cells. *Z. Anorg. Allg. Chem.* 2021, 647, 1921-1929]. The aforementioned carbon-based nanocomposites' overall chemical and physical properties are influenced by both the interfaces and the grain boundaries in addition to the inherent properties of the individual ingredients. It is commonly known that electrical conductivity has a major role in determining the performance and applicability of these materials as electrode materials in energy storage devices, including fuel cells, lithium-ion batteries, and supercapacitors. However, several investigations have discovered a relationship between different metal oxides' electrical conductivity and their capacity for catalysis and gas sensing. Thus, it becomes evident that the exact measurement and comparison of electrical conductivity is a preferred method for assessing numerous potential applications of carbon-based composites, incorporating nanoparticles of different metal oxides.

BiOI, or bismuth oxy-iodide, is a promising active material with a unique layered structure, cheap cost, and semiconducting properties for various electrical and electrochemical applications. The crystal structure is tetragonal, with two slabs of iodide ions ensconced within an open-layered crystal structure of $[Bi_2O_2]^{2+}$ layers. Ion diffusion and electron transport are facilitated by the characteristic layered structure. However, BiOI has relatively poor intrinsic electronic conductivity, therefore, creating two-dimensional structures and adding oxygen vacancies are efficient ways to raise electrochemical active sites and enhance electronic conductivity [See: Wang, H.; Wang, Z.; Tian, H.; Cheng, R.; Lin, M.; Sun, X.; Ran, S.; Lv, Y. Two dimensional oxygen-deficient bismuth oxy-iodide nanosheets with enhanced supercapacitor performances. *Int. J. Electrochem. Sci.* 2020, 15, 7982-7993].

Although a few nanocomposites of BiOI have been developed in the past to enhance their electrical and electrochemical properties, most of these nanocomposites are laborious to prepare, expensive, or have poor electrical characteristics. Accordingly, the object of the present disclosure is to develop a nanocomposite by doping BiOI with a carbon-based material that can overcome the limitations of the art.

SUMMARY

In an exemplary embodiment, a method for producing an activated carbon/bismuth oxy-iodide nanocomposite is described. The method includes heating a glycol solution including $Bi(NO_3)_3 \cdot 5H_2O$ and activated carbon to 100° C.; heating a glycol solution including potassium iodide to 100° C. The method includes adding the glycol solution including $Bi(NO_3)_3 \cdot 5H_2O$ and activated carbon and the glycol solution including potassium iodide to a reaction vessel including a solvent to form a reaction mixture. The method includes chilling the reaction mixture to ambient temperature; and filtering the reaction mixture to obtain the activated carbon/bismuth oxy-iodide nanocomposite. The activated carbon/bismuth oxy-iodide nanocomposite includes 1% or greater carbon and the activated carbon/bismuth oxy-iodide nanocomposite has a DC conductivity equal to or greater than $1.0 \times 10^{-9}$ $ohm^{-1} \cdot cm^{-1}$ and an AC conductivity equal to or greater than $2.0 \times 10^{-5}$ $ohm^{-1} \cdot cm^{-1}$.

In some embodiments, the glycol solution includes ethylene glycol.

In some embodiments, the concentration of $Bi(NO_3)_3 \cdot 5H_2O$ in the reaction mixture is in a range from 0.05 to 0.25 M.

In some embodiments, the concentration of potassium iodide in the reaction mixture is in a range from 0.05 to 0.25 M.

In some embodiments, the amount of activated carbon in the glycol solution including $Bi(NO_3)_3 \cdot 5H_2O$ and activated carbon is greater than or equal to 1% of the amount of $Bi(NO_3)_3 \cdot 5H_2O$ present.

In some embodiments, the amount of activated carbon in the glycol solution including $Bi(NO_3)_3 \cdot 5H_2O$ and activated carbon is greater than or equal to 5% of the amount of $Bi(NO_3)_3 \cdot 5H_2O$ present.

In some embodiments, the amount of activated carbon in the glycol solution including $Bi(NO_3)_3 \cdot 5H_2O$ and activated carbon is greater than or equal to 10% of the amount of $Bi(NO_3)_3 \cdot 5H_2O$ present.

In some embodiments, the solvent is water.

In some embodiments, the activated carbon/bismuth oxy-iodide nanocomposite includes 1.2% or greater carbon.

In some embodiments, the activated carbon/bismuth oxy-iodide nanocomposite includes 1.5% or greater carbon.

In another exemplary embodiment, nanocomposite includes bismuth oxy-iodide; and activated carbon. The nanocomposite includes 1% or greater carbon and the nanocomposite has a DC conductivity equal to or greater than $1.0 \times 10^{-9}$ $ohm^{-1} \cdot cm^{-1}$ and an AC conductivity equal to or greater than $2.0 \times 10^{-5}$ $ohm^{-1} \cdot cm^{-1}$.

In some embodiments, the activated carbon/bismuth oxy-iodide nanocomposite includes 1.2% or greater carbon.

In some embodiments, the activated carbon/bismuth oxy-iodide nanocomposite includes 1.5% or greater carbon.

In some embodiments, the nanocomposite has a DC conductivity equal to or greater than $3.2 \times 10^{-8}$ $ohm^{-1} \cdot cm^{-1}$ and an AC conductivity equal to or greater than $7.0 \times 10^{-5}$ $ohm^{-1} \cdot cm^{-1}$.

In some embodiments, the nanocomposite has a DC conductivity equal to or greater than $5.2 \times 10^{-4}$ $ohm^{-1} \cdot cm^{-1}$ and an AC conductivity equal to or greater than $2.75 \times 10^{-4}$ $ohm^{-1} \cdot cm^{-1}$.

In some embodiments, the nanocomposite has a dielectric constant equal to or greater than 8.

In some embodiments, the nanocomposite has a dielectric constant equal to or greater than 14.

In some embodiments, the nanocomposite has a dielectric constant equal to or greater than 34.

In some embodiments, the nanocomposite has an impedance less than or equal to $140 \times 10^{-3}$ ohm.

In some embodiments, the nanocomposite has an impedance less than or equal to $90 \times 10^{-3}$ ohm.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
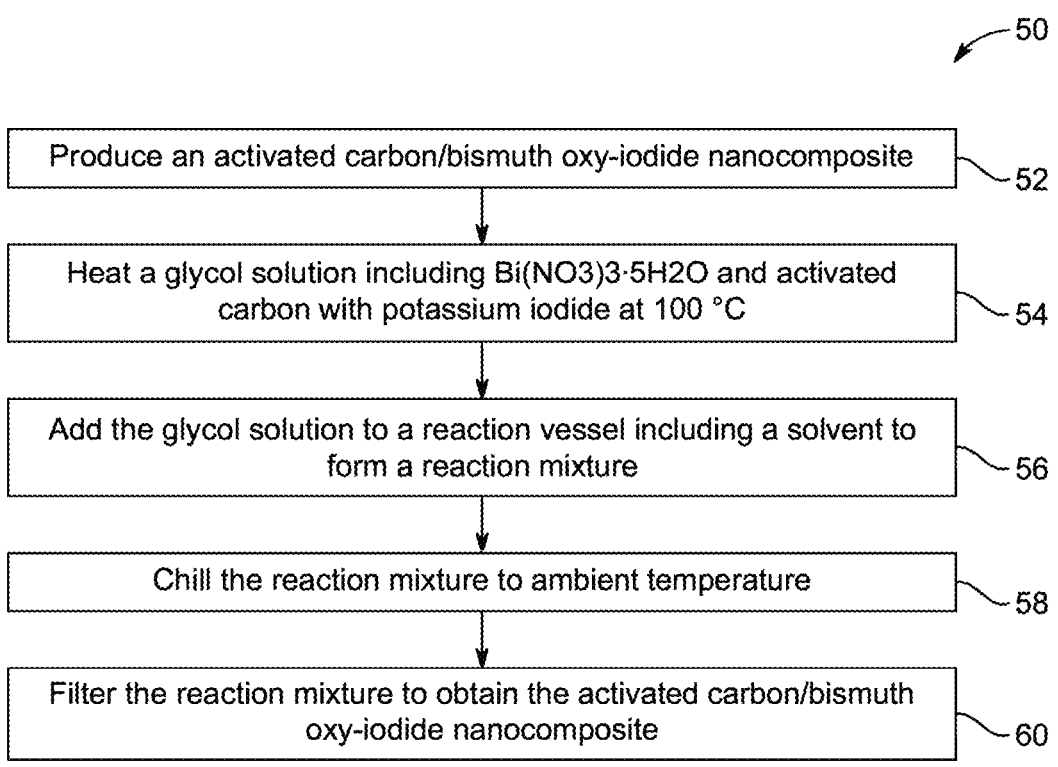
FIG. 1 is a flowchart of a method of making a nanocomposite, according to certain embodiments.

In the drawings, reference numerals designate identical or corresponding parts throughout the several views. Further, as used herein, the words "a," "an," and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

As used herein, "composite" refers to a combination of two or more distinct constituent materials into one continuous or discontinuous mass. On an atomic level, the individual components remain separate and distinct within the finished structure. The materials may have different physical or chemical properties that, when combined, produce a material with characteristics different from the original components.

As used herein, the term 'electrical conductivity' refers to the ability of a material to conduct electric current. It is defined as the ratio of the current density to the electric field strength and is typically measured in siemens per meter (S/m). High electrical conductivity indicates that a material can easily allow the flow of electric current, while low conductivity suggests that it acts as an insulator. This property is desired in various applications, including electronics, materials science, and energy storage.

Aspects of the present disclosure are directed at solving the problems of low electronic conductivity (poor electrical properties) of pure BiOI by fabricating a nanocomposite of activated carbon and bismuth oxy-iodide. The influence of doping activated carbon on the electric properties of bismuth oxy-iodide and the effect of the frequency on electrical conductivity, dielectric constant, and impedance of the nanocomposite are disclosed. The nanocomposites of the present disclosure demonstrate increased electrical conductivity compared to pure bismuth oxy-iodide. The results suggest its potential use in electrical applications, such as dielectric absorbers, charge-stored capacitors, and high-frequency microwave devices.

According to a first aspect of the present disclosure, a nanocomposite is described. The nanocomposite includes bismuth oxy-iodide and activated carbon. BiOI, or bismuth oxy-iodide, is a promising active material with a unique layered structure, cheap cost, and semiconducting properties for various electrical and electrochemical applications. However, BiOI has relatively poor intrinsic electronic conductivity; therefore, BiOI is doped with a carbon-based conducting material, preferably activated carbon, owing to its desired chemical characteristics, high electrical conductivity, surface area, and thermal conductivity. Activated carbon can be obtained from multiple sources by methods known in the art or can be procured commercially.

Activated carbon is a form of porous carbon with a semi-crystalline, semi-graphitic structure, and a large surface area. Activated carbon may be in the form of particles or particulate aggregates having micropores and/or mesopores. Typically has a surface area of approximately 500 to 5000 m²/g, and a mean particle size of 1 to 250 nm, preferably 2 to 200 nm, preferably 5 nm to 175 nm, preferably 10 to 150 nm, preferably 15 to 125 nm, preferably 25 to 100 nm. The activated carbon particles may have a spherical shape, or may be shaped like blocks, flakes, ribbons, discs, granules, platelets, angular chunks, rectangular prisms, or some other shape. In some embodiments, the activated carbon particles may be substantially spherical, meaning that the distance from the activated carbon particle centroid (center of mass) to anywhere on the activated carbon particle outer surface varies by less than 30%, preferably by less than 20%, more preferably by less than 10% of the average distance. In some embodiments, the activated carbon particles are in the form of blocks, flakes, granules, discs, angular chunks, rectangular prisms, or platelets having a mean size in a range as previously described and having a largest dimension that is 50 to 500%, preferably 75 to 400%, preferably 100 to 350%, preferably 150 to 250% of the range previously described and a smallest dimension that is 0.01 to 100%, preferably 0.1 to 50%, preferably 0.5 to 25%, preferably 1 to 10% of the range previously described. In some embodiments, the activated carbon particles may be in the form of agglomerates, as described above. In some embodiments, the activated carbon particles are monodisperse, as described above. In alternative embodiments, the activated carbon particles are not monodisperse.

In some embodiments, the bismuth oxy-iodide may be substituted with other bismuth oxy-halides, such as bismuth oxy-chloride and bismuth oxy-bromide. In some embodiments, the activated carbon may be substituted with/used along with other carbon-based conductive materials such as graphene, carbon nanotubes, carbon nanofibers, etc.

The percentage of activated carbon in the nanocomposite is a factor influencing the degree of interaction between carbon (activated carbon) and BiOI. The strength of the interaction between the activated carbon and BiOI is determined by crystal lattice, crystallite size, and lattice strain, as obtained from the X-ray diffractogram (XRD) data. In an embodiment, the crystal size of the nanocomposite is in the range of 15-40 nm, preferably 20-35 nm. In a preferred embodiment, the crystal size of the nanocomposite is about 20-25 nm, preferably 20-23 nm, preferably 20-21 nm, preferably about 20.93 nm. In another preferred embodiment, the crystal size of the nanocomposite is about 30-35 nm, preferably 32-35 nm, preferably 34-35 nm, preferably about 34.8 nm.

The crystal lattice size of the nanocomposite is about 0.022-0.023 angstroms, preferably 0.0222 angstroms, preferably 0.0224 angstroms, preferably 0.0226 angstroms, preferably 0.0227 angstroms, preferably 0.0229 angstroms, which is lower than the lattice strain of pure BiOI. Pure BiOI has a crystal lattice size of about 0.02273 angstroms. In some embodiments, the crystallite size of the nanocomposite is about 0.0226-0.0227 angstroms. In a preferred embodiment, the crystal lattice size of the nanocomposite is 0.02268 angstroms. In another preferred embodiment, the crystal lattice size of the nanocomposite is 0.0226 angstroms.

The lattice strain of the nanocomposite is in the range of 0.604-0.607 angstroms, which is higher than the lattice strain of pure BiOI. Pure BiOI has a lattice strain of about 0.6028 angstroms. In a preferred embodiment, the lattice strain of the nanocomposite is 0.604-0.0605 angstroms, preferably about 0.60412 angstroms. In another preferred embodiment, the lattice strain of the nanocomposite is 0.606-0.607 angstroms, preferably about 0.60633 angstroms.

In some embodiments, the crystal lattice size of the nanocomposite is slightly lower than the crystal lattice size of pure BiOI. In some embodiments, the lattice strain of the nanocomposite is slightly higher than the lattice strain of pure BiOI. The lower crystallite size and the higher lattice strain of the nanocomposite in comparison to pure BiOI is indicative of a strong interaction between the BiOI and the activated carbon.

XRD analysis also shows that the BiOI in the nanocomposite may exist in two different phases—the BiOI phase and the $Bi_3O_5I_2$ phase—with the BiOI phase being the predominant one.

Morphological analysis shows that the nanocomposite has particle sizes ranging from 10 to 50 nm, preferably 12 nm, preferably 14 nm, preferably 16 nm, preferably 18 nm, preferably 20 nm, preferably 22 nm, preferably 24 nm, preferably 26 nm, preferably 28 nm, preferably 30 nm, preferably 32 nm, preferably 34 nm, preferably 36 nm, preferably 38 nm, preferably 40 nm, preferably 42 nm, preferably 44 nm, preferably 46 nm, preferably 48 nm, preferably 50 nm, and all particle size ranges in between. In some embodiments, the nanocomposite has a particle size in the range of 32.2 to 36.7 nm. In another embodiment, the nanocomposite has a particle size in the range of 11.7 to 29.4 nm. In yet another embodiment, the nanocomposite has a particle size in the range of 26.9 to 47.9 nm.

Elemental analysis shows that the nanocomposite includes carbon by mass percent in an amount of greater than 1%, preferably 1.1%, preferably 1.2%, preferably 1.3%, preferably 1.4%, preferably 1.5%. In some embodiments, the nanocomposite includes carbon in the range of 1-10%, preferably 1-9%, preferably 1-8%, preferably 1-7%, preferably 1-6%, preferably 1-5%, preferably 1-4%, preferably 1-3%, and more preferably about 1-2%. The nanocomposite further includes oxygen in the range of 1-5%, preferably 2-3%; iodine in the range of 25-40%, preferably 27-37%, preferably 30-35%; and bismuth in the range of 60-62%. This range includes all intermediate values and subranges. The percentage of each element in the nanocomposite may vary beyond the suggested ranges based on the amount of activated carbon doped in the nanocomposite.

In one embodiment, the nanocomposite includes about 1.21 mass % of carbon, 2.34 mass % of oxygen, 34.64 mass % of iodine, and 61.81 mass % of bismuth. In another embodiment, the nanocomposite includes about 1.00 mass % of carbon, 2.42 mass % of oxygen, 34.84 mass % of iodine, and 61.74 mass % of bismuth. In another embodiment, the nanocomposite includes about 0.92 mass % of carbon, 2.42 mass % of oxygen, 35.07 mass % of iodine, and 61.59 mass % of bismuth.

The nanocomposite of the present disclosure is evaluated for electrical properties, such as AC conductivity, DC conductivity, dielectric constant, and impedance. When the DC method was used to evaluate the electrical characteristics of the nanocomposite, it demonstrated an increase in conductivity (a decrease in resistivity) with an increase in temperature at a temperature range between 303 and 428 K. With the increase in temperature, the activation energy decreases, and so does the resistance, which increases its conductivity. The activation energy of the nanocomposites (under the DC field) was found to be in the range of 0.011 to 0.026 eV, much lower than the activation energy for pure bismuth oxy-iodide (0.037 eV). In a specific embodiment, the activation energy of the nanocomposite under a DC field with a carbon content of 1.5% is about 0.011 eV, much lower than that of bismuth oxy-iodide, indicating the ease with which electric current is passed through it.

Similarly, when the AC method was used to evaluate the electrical characteristics of the nanocomposite, it demonstrated an increase in conductivity with an increase in temperature. This is because electrons gain energy with an increase in temperature, causing a greater movement of electrons between the valence band and the conduction band, leading to an increase in conductivity.

Also, the nanocomposite exhibits an increase in AC conductivity with an increase in frequency at a frequency range of 59 KHz to 1.29 KHz, particularly at frequencies of 59 KHz, 117 KHz, 177 KHz, 235 KHz, 294 KHz, 353 KHz, 412 KHz, 529 KHz, 647 KHz, 765 KHz, 824 KHz, 1 MHz, and 1.29 MHz. This is because of the liberation of charge carriers trapped in confined spaces and the heightened migration and movement of the liberated charge carriers among various locations that might cause an increase in conductivity levels at high frequencies. Although all the nanocomposites demonstrate an increase in AC conductivity with an increase in frequency, this is more pronounced in the nanocomposite doped with activated carbon having a carbon content greater than 1.5%. This is because carbon doping causes oxygen (IV) atoms to replace oxygen (II) atoms, resulting in oxygen defects. As a result, the rise in doping concentration causes an increase in oxygen defects. These native point defects function as shallow donors and raise the carrier density (enhance conductivity) of the nanocomposite.

The AC and DC conductivity of pure BiOI is about $1.0 \times 10^{-5}$ $ohm^{-1} \cdot cm^{-1}$ and $2.0 \times 10^{-5}$ $ohm^{-1} \cdot cm^{-1}$, more specifically about $1.1 \times 10^{-5}$ $ohm^{-1} \cdot cm^{-1}$ and $2.23 \times 10^{-5}$ $ohm^{-1} \cdot cm^{-1}$, respectively, which is much lower than that of the nanocomposite of the present disclosure. In a specific embodiment, the nanocomposite having a carbon content of about 1% or greater, has a DC conductivity equal to or greater than $1.0 \times 10^{-9}$ $ohm^{-1} \cdot cm^{-1}$, preferably $1.09 \times 10^{-9}$ $ohm^{-1} \cdot cm^{-1}$ and an AC conductivity equal to or greater than $2.0 \times 10^{-5}$ $ohm^{-1} \cdot cm^{-1}$, preferably $2.3 \times 10^{-5}$ $ohm^{-1} \cdot cm^{-1}$. In another embodiment, the nanocomposite having a carbon content of about 1.2% or greater, has a DC conductivity equal to or greater than $3.2 \times 10^{-8}$ $ohm^{-1} \cdot cm^{-1}$, preferably $3.47 \times 10^{-9}$ $ohm^{-1} \cdot cm^{-1}$ and an AC conductivity equal to or greater than $7.0 \times 10^{-5}$ $ohm^{-1} \cdot cm^{-1}$, preferably $7.1 \times 10^{-5}$ $ohm^{-1} \cdot cm^{-1}$ In yet another embodiment, the nanocomposite having a carbon content of about 1.5% or greater, has a DC conductivity equal to or greater than $5.2 \times 10^{-4}$ $ohm^{-1} \cdot cm^{-1}$, preferably $5.56 \times 10^{-4}$ and an AC conductivity equal to or greater than $2.75 \times 10^{-4}$ $ohm^{-1} \cdot cm^{-1}$, preferably $2.86 \times 10^{-4}$ $ohm^{-1} \cdot cm^{-1}$.

The dielectric constant is the measure of the ability of the nanocomposite to store electrical energy. In an embodiment, when the nanocomposite has carbon content greater than 1%, the dielectric constant of the nanocomposite is greater than 8, preferably greater than 8.2, preferably greater than 8.4, preferably about 8.5. In an embodiment, when the nanocomposite has carbon content greater than 1.2%, the dielectric constant of the nanocomposite is greater than 14, preferably greater than 14.2, preferably about 14.47. In an embodiment, when the nanocomposite has carbon content greater than 1.5%, the dielectric constant of the nanocomposite is greater than 34, preferably greater than 34.2, preferably about 34.55. The dielectric constant of the nanocomposite in all the described embodiments is greater than that of bismuth oxy-iodide (which is about 7.5 at 70 KHz)—which indicates that the nanocomposite of the present disclosure can store greater electrical energy than that of pure BiOI.

Impedance measures how much alternating current is impeded or avoided in the circuit at a given voltage. Therefore, the higher the impedance, the lower the conductivity. In an embodiment, the nanocomposite has an impedance in the range of $50\text{-}150\times10^{-3}$ Ohms, which is lesser than pure BiOI ($156\times10^{-3}$ Ohm). In a specific embodiment, the nanocomposite having a carbon content of about 1% or greater has an impedance less than or equal to $140\times10^{-3}$ Ohm, preferably $130\times10^{-3}$ Ohm. In another embodiment, the nanocomposite having a carbon content of about 1.2% or greater has an impedance less than or equal to $90\times10^{-3}$ Ohm, preferably $85\times10^{-3}$ Ohm. In another embodiment, the nanocomposite having a carbon content of about 1.5% or greater has an impedance less than or equal to $50\times10^{-3}$ Ohm, preferably $52\times10^{-3}$ Ohm.

According to a second aspect of the present disclosure, a method 50 for producing an activated carbon/bismuth oxy-iodide nanocomposite is described (FIG. 1). The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure.

At step 52, the method 50 includes heating a glycol solution comprising $Bi(NO_3)_3 \cdot 5H_2O$ and activated carbon. The glycol solution includes at least one glycol-based solvent, such as ethylene glycol, propylene glycol, 1,3-propanediol, diethylene glycol, triethylene glycol, 1,2-propylene glycol, 1,3-propylene glycol, dipropylene glycol, butylene glycol, or combinations thereof. In a preferred embodiment, the glycol solution includes ethylene glycol. It will be understood by one with ordinary skill in the art that other glycol-based solvents with similar structures and properties may be suitable. The glycol solution may also contain non-reactive diluents or additives to aid in the formation of the composite or final properties. The additives may include surfactants and fillers. In an embodiment, the glycol solution consists of a glycol-based solvent, preferably ethylene glycol.

In an embodiment, the amount of activated carbon in the glycol solution is greater than or equal to 1%, preferably greater than or equal to 5%, preferably greater than or equal to 10% of the amount of $Bi(NO_3)_3 \cdot 5H_2O$ present.

In some embodiments, the glycol solution, including $Bi(NO_3)_3 \cdot 5H_2O$ and activated carbon, may be mixed via stirring, shaking, swirling, sonicating, blending, or otherwise agitating before heating the glycol solution at 50-150° C., preferably 60-120° C., more preferably 70-100° C., or about 100° C., preferably in an autoclave/reactor, for 6-48 hours. An external heat source, such as an oven, a heating mantle, a water bath, or an oil bath, may also be employed to heat the glycol solution.

At step 54, the method 50 includes heating a glycol solution comprising potassium iodide to 100° C. The glycol solution includes at least one glycol-based solvent, such as ethylene glycol, propylene glycol, 1,3-propanediol, diethylene glycol, triethylene glycol, 1,2-propylene glycol, 1,3-propylene glycol, dipropylene glycol, butylene glycol, or combinations thereof. In a preferred embodiment, the glycol solution includes ethylene glycol. In some embodiments, the glycol solution, including potassium iodide, can be sonicated before heating to ensure complete dissolution of the potassium iodide in the glycol solution. It will be understood by one with ordinary skill in the art that other glycol-based solvents with similar structures and properties may be suitable. The glycol solution may also contain non-reactive diluents or additives to aid in the formation of the composite or final properties. The additives may include surfactants and fillers. In an embodiment, the glycol solution consists of a glycol-based solvent, preferably ethylene glycol.

At step 56, the method 50 includes adding the glycol solution comprising $Bi(NO_3)_3 \cdot 5H_2O$ and activated carbon and the glycol solution comprising potassium iodide to a reaction vessel comprising a solvent to form a reaction mixture. This reaction is preferably formed via a one-pot strategy. As used herein, the terms "one-pot" and "single-pot" refer to a processing approach whereby starting materials, i.e., $Bi(NO_3)_3 \cdot 5H_2O$, activated carbon, and potassium iodide, are mixed and undergo physical/chemical transformations in a single container (e.g., a single reactor, a single vessel).

The molar concentration of potassium iodide in the glycol solution is similar to that of $Bi(NO_3)_3 \cdot 5H_2O$ in the glycol solution. In an embodiment, the concentration of $Bi(NO_3)_3 \cdot 5H_2O$ in the reaction mixture ranges from 0.05 to 0.25 M. In another embodiment, potassium iodide concentration in the reaction mixture ranges from 0.05 to 0.25 M. In other words, it is preferred that the molar concentration of potassium iodide and $Bi(NO_3)_3 \cdot 5H_2O$ is 1:1, although other ranges, for example, 1:2 or 2:1, are also possible. It will be understood by one with ordinary skill in the art that a range of molar concentrations of potassium iodide and $Bi(NO_3)_3 \cdot 5H_2O$ is possible, and that the ratio will affect the performance of the reaction and products.

Both glycol solutions are mixed in a closed reaction vessel and subjected to a hydrothermal 5 reaction, where the solvent is water, at temperatures between 40-120° C., preferably between 60-100° C., for a sufficient period, to form the reaction mixture.

In some embodiments, the hydrothermal reaction is carried out by adding a glycol solution of bismuth oxyiodide and activated carbon, in defined weight ratios, into a closed reaction vessel and subjected to a hydrothermal reaction, where the solvent is water, at temperatures between 40-120° C., preferably between 60-100° C., for a sufficient period, to form the reaction mixture. In this embodiment, the bismuth oxyiodide may be obtained by any methods conventionally known in the art. The bismuth oxy-iodide, as described in this embodiment, has a carbon content of less than 1%, preferably less than 0.95%, preferably about 0.9-0.94%, and more preferably about 0.92% based on the total weight of bismuth oxyiodide. In some embodiments, the particle size of the bismuth oxy-iodide as described herein is in the range of 20.0-69.3 nm, with particle sizes including 10 nm, 22 nm, 24 nm, 26 nm, 28 nm, 30 nm, 32 nm, 34 nm, 36 nm, 38 nm, 40 nm, 42 nm, 44 nm, 46 nm, 48 nm, 50 nm, 52 nm, 54 nm, 56 nm, 58 nm, 60 nm, 62 nm, 64 nm, 66 nm, 68 nm, 69 nm, and all ranges in between.

At step 60, the method 50 includes chilling the reaction mixture to ambient temperature. Ambient temperature refers to about 10-30° C. In some embodiments, the hydrothermal treatment may be carried out at a reaction temperature and time beyond the suggested ranges and the conditions can be chosen based on the desired particle size and morphology of the nanocomposite.

At step 60, the method 50 includes filtering the reaction mixture to obtain the activated carbon/bismuth oxy-iodide nanocomposite. The nanocomposite is separated from the reaction mixture via filtration, preferably via a suction system. Other modes of filtration based on gravity are also possible. An advantage of filtration via suction is that this method accelerates the filtration process, reducing the time required for solid-liquid separation compared to traditional methods.

The nanocomposite of the present disclosure can be used in electronics, photonics, microelectromechanical (MEMS) packaging, heat spreaders, heat sinks, packages, modules, heat pipes, housings, enclosures, heat exchangers, radiant heaters, thermal interface materials, heat spreaders, films, fibers, powders, coatings, automotive applications including, for example, under-hood components, radiators, sensor housings, electronic modules, or fuel cells, industrial applications, including, for example, electrical coil components, pump parts, electric motor parts, transformers, piping, tubing, or heating, ventilation or air conditioning (HVAC) equipment.

The examples below are intended to illustrate further protocols for preparing and characterizing the nanocomposite and are not intended to limit the scope of the claims.

Examples

The following examples demonstrate the preparation of activated carbon/BiOI nanocomposites. The examples are provided solely for illustration and are not to be construed as limitations of the present disclosure, as many variations thereof are possible without departing from the spirit and scope of the present disclosure.

Example 1: Material and Method

Ethylene glycol (EG) was provided from Sigma Aldrich located in Burlington, MA, USA, and bismuth nitrate pentahydrate ($Bi(NO_3)_3 \cdot 5H_2O$) was purchased from BDH, London, UK. Potassium iodide (KI) was supplied from Sharlau-Barcelona, Spain, and the activated carbon was provided from Fluka, Buchs, Switzerland (99.9%).

Example 2: Synthesis of BiOI and Activated Carbon/BiOI Composites

BiOI was synthesized by an in situ method by dissolving equimolar quantities (0.0288 mol) of ($Bi(NO_3)_3 \cdot 5H_2O$), and the same moles of KI were dissolved separately in 150 millilitre (mL) and 30 mL of EG, respectively. The EG solutions were heated to approximately 100° C. After that the two solutions were poured into 200 mL of boiling distilled water (DW), which was subsequently chilled to the ambient temperature, and the product was filtered using a suction system. The procedure was replicated by adding 0.1018, 0.5305, and 1.12 gram (g) of AcC to the bismuth solution to obtain 1C/BiOI, 5C/BiOI, and 10C/BiOI, where the 1, 5, and 10 in 1C/BiOI, 5C/BiOI, and 10C/BiOI refer nominally to the weight percent of added AcC relative to the expected weight of BiOI to be obtained from the procedure lacking added AcC.

Example 3: Characterization

The X-ray diffractometry (XRD) was studied to identify the crystallinity of samples employing Japan-made JDX-8030 X-ray, JEOL located in Tokyo, Japan. The patterns used Cu-filtered CuKα radiation (1.5418 Å) driven at 45 (kilovolt) kV and 10 (milliampere) mA. The test samples were subjected to ambient temperatures between 2θ=5 and 80°. TEM-SAED-HRTEM images were used to examine the surface morphologies of the collected samples using a 200 kV speed voltage transmission electron microscope (Tecnai G20, Hillsboro, OR, USA). Using high-resolution JEOL JEM-6700F equipment in conjunction with electron-dispersive X-ray spectroscopy (EDS), energy-dispersive X-ray spectroscopy (EDX) was used to estimate the elemental composition of materials. After monochromatic Al—Kα irradiation, the binding energy values of the synthesized catalysts were modified using C1s (284.6 eV) and evaluated using a KRATOS-AXIS DLD analyzer, Manchester, UK.

Example 4: Electrical Measurements

A two-probe method to measure the electrical conductivity (EC) of tablets 10 millimeter (mm) in diameter and about 1 mm thick was used. The tablets were made by pressing powder under a $2 \times 10^{-3}$ kilogram per centimeter square ($kg/cm^2$) pressure. Silver paste is placed on both surfaces of the tablet. The tablets are placed in the oven to remove any moisture. Under typical room conditions, the electrical conductivity, dielectric constant, dielectric loss, and impedance were measured using a programmable automatic LCR bridge (model HIOKI IM 3536, Nagano, Japan) at a fixed voltage (1.0 V) and frequencies between 1000 Hertz (Hz) and 2 Megahertz (MHz). The frequency dependent complex dielectric function can be expressed via Equation (8) (See: Misra, D. K. Evaluation of the complex permittivity of layered dielectric materials with the use of an open-ended coaxial line. *Microw. Opt. Technol. Lett.* 1996, 11, 183-187.):

$$\varepsilon^{**}(\omega)=\varepsilon'(\omega)-j\varepsilon''(\omega) \tag{8}$$

With $j=\sqrt{-1}$, the imaginary part of the permittivity is represented by $\varepsilon''$, while the real part is represented by $\varepsilon'$. Equations (9) and (10) were used to approximate the values for $\varepsilon'$ and $\varepsilon''$:

$$\varepsilon'=Cd/\varepsilon°A_s \tag{9}$$

$$\varepsilon''(\omega)=\varepsilon'(\omega)\tan \delta \tag{10}$$

where: $\varepsilon°(\varepsilon°=8.86\times10-12$ F/m): the free space permittivity; d: Thickness; As: cross-section area; Tan δ: dissipative factor; $\omega(2\pi f)$: electric field frequency. The electrical conductivity at direct (dc) and alternating current (AC) was measured at temperatures ranging from 25 to 180° C.

Figure 2:
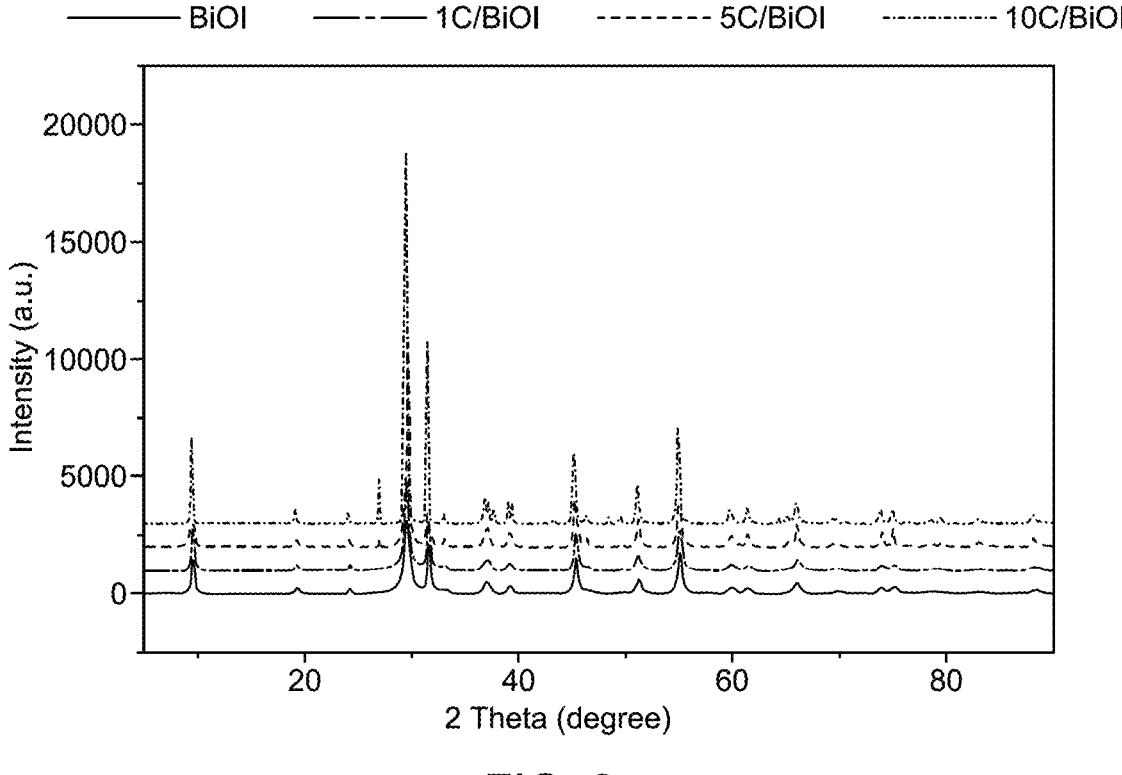
FIG. 2 shows X-ray diffraction (XRD) diffraction patterns of BiOI (pure bismuth oxyiodide), 1C/BiOI (bismuth oxyiodide doped with 1% activated carbon), 5C/BiOI (bismuth oxyiodide doped with 5% activated carbon), and 10C/BiOI (bismuth oxyiodide doped with 10% activated carbon), according to certain embodiments.
Figure 3A:
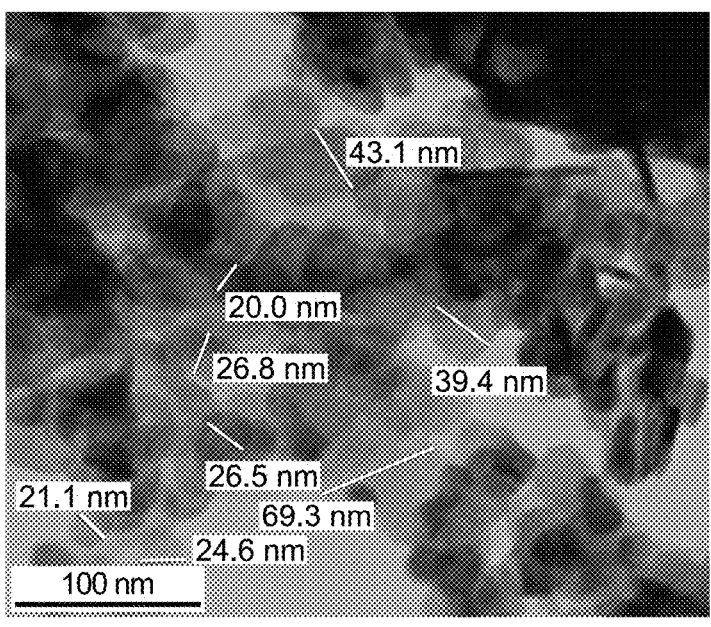
FIG. 3A shows transmission electron microscopy (TEM) image of BiOI, according to certain embodiments.
Figure 3B:
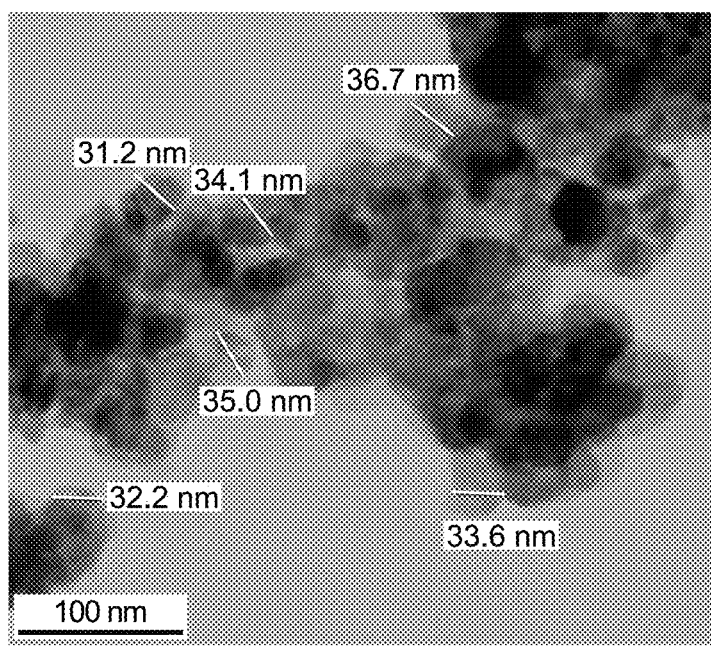
FIG. 3B shows TEM image of 1C/BiOI nanocomposite, according to certain embodiments.
Figure 3C:
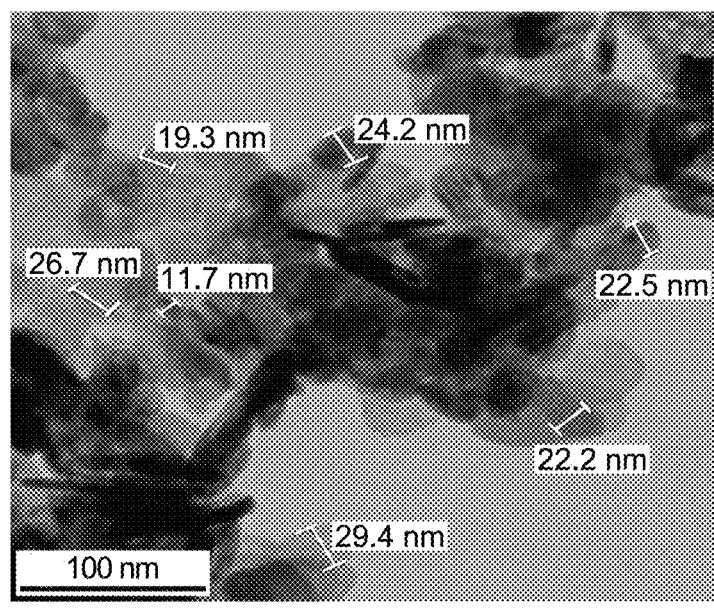
FIG. 3C shows TEM image of 5C/BiOI nanocomposite, according to certain embodiments.
Figure 3D:
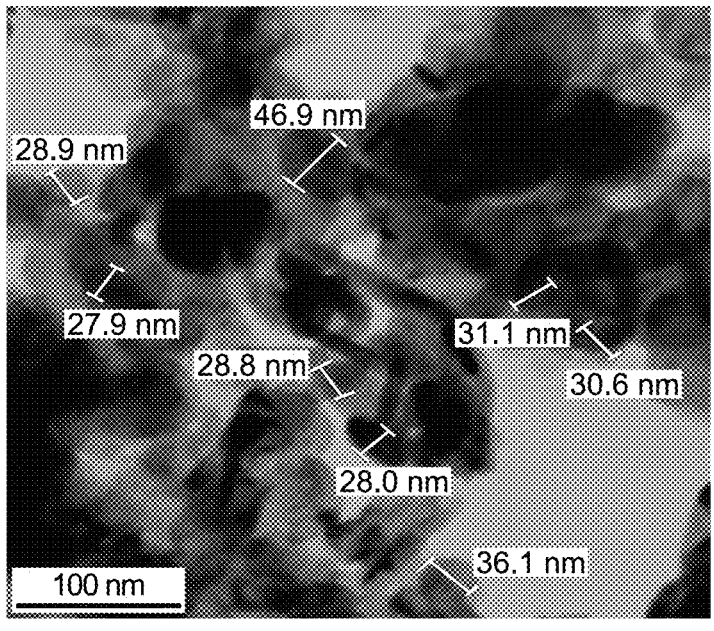
FIG. 3D shows TEM result of 10C/BiOI nanocomposite, according to certain embodiments.
Figure 4A:
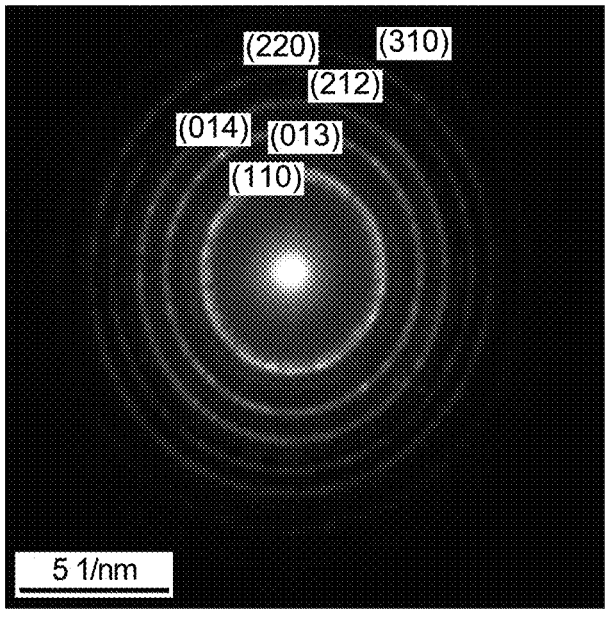
FIG. 4A shows selected area electron diffraction (SAED) image via electron diffraction high-resolution transmission electron microscopy (HRTEM) of BiOI, according to certain embodiments.
Figure 4B:
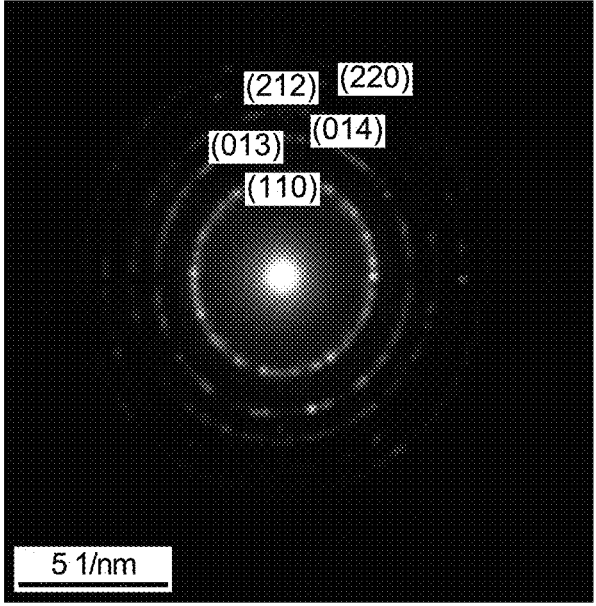
FIG. 4B shows SAED image via electron diffraction HRTEM of 1C/BiOI nanocomposite, according to certain embodiments.
Figure 4C:
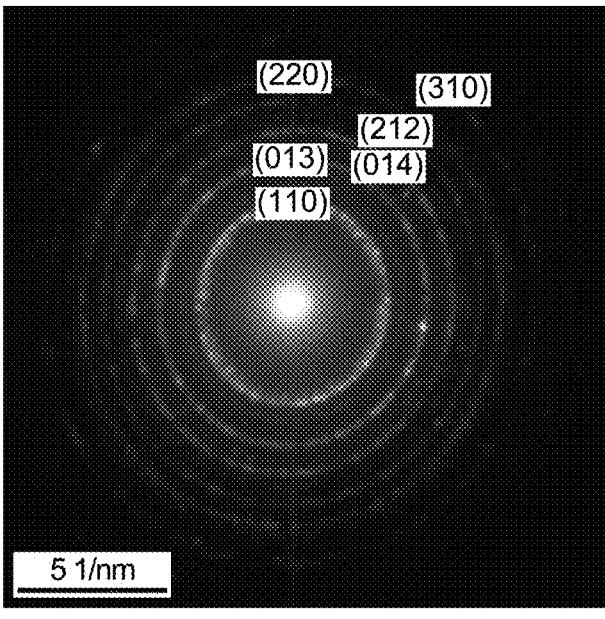
FIG. 4C shows SAED image via electron diffraction HRTEM of 5C/BiOI nanocomposite, according to certain embodiments.
Figure 4D:
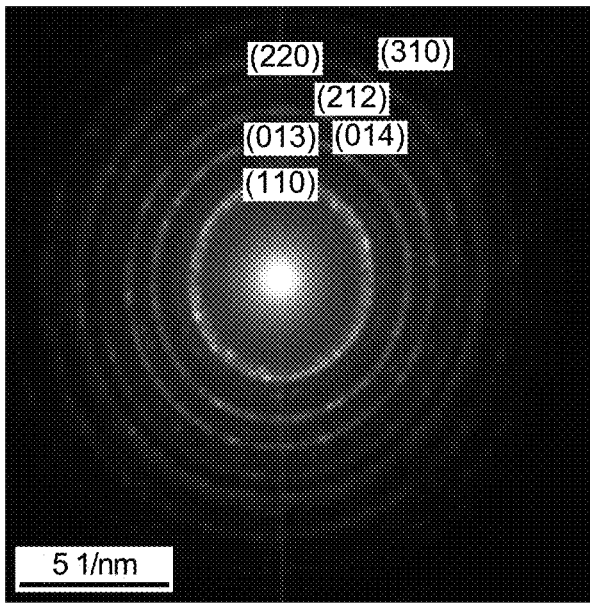
FIG. 4D shows SAED image via electron diffraction HRTEM of 10C/BiOI nanocomposite, according to certain embodiments.
Figure 5A:
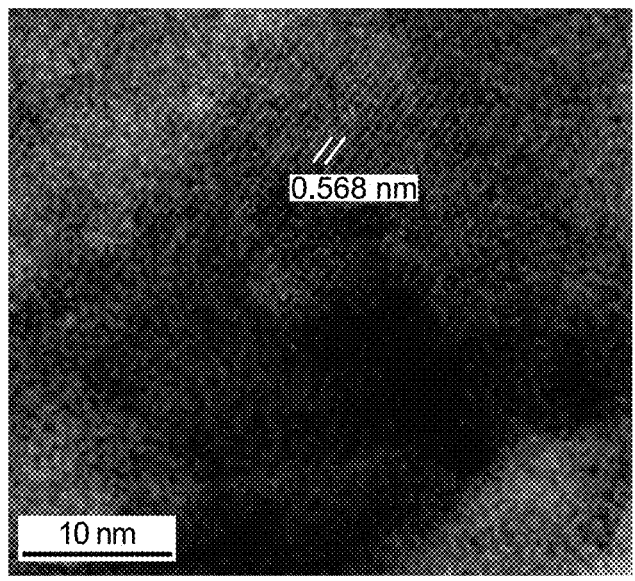
FIG. 5A shows HRTEM d-spacing of BiOI, according to certain embodiments.
Figure 5B:
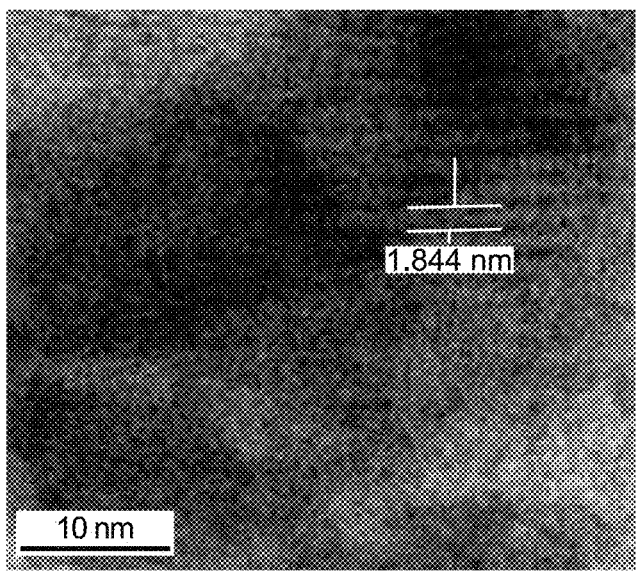
FIG. 5B shows HRTEM d-spacing of 1C/BiOI nanocomposite, according to certain embodiments.
Figure 5C:
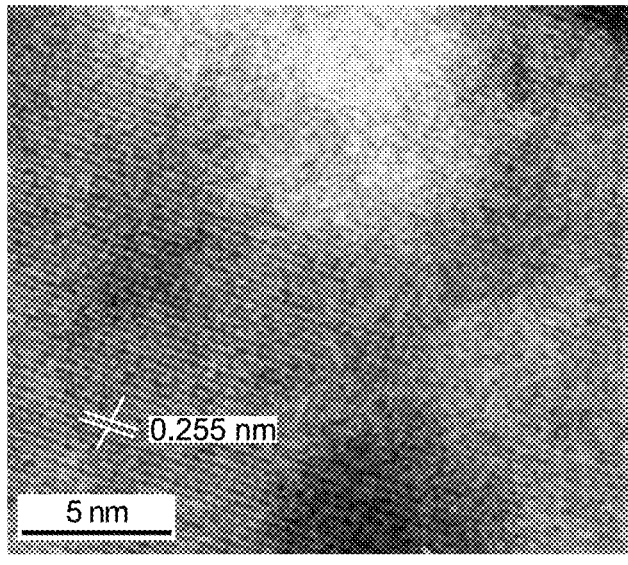
FIG. 5C shows HRTEM d-spacing of 5C/BiOI nanocomposite, according to certain embodiments.
Figure 5D:
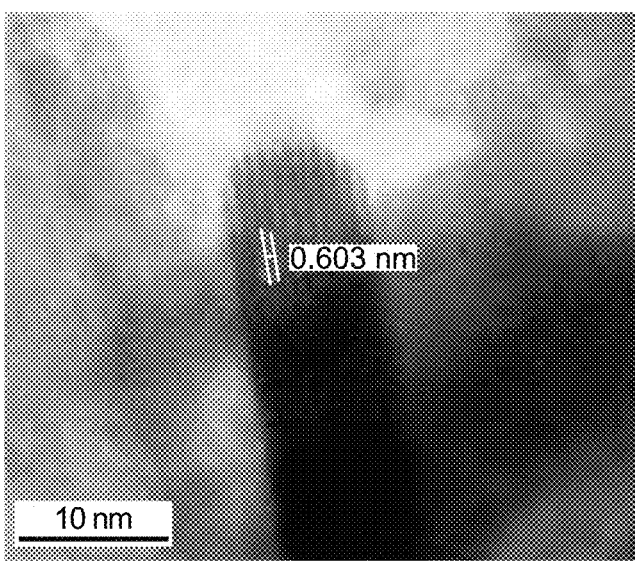
FIG. 5D shows HRTEM d-spacing of 10C/BiOI nanocomposite, according to certain embodiments.
Figure 6A:
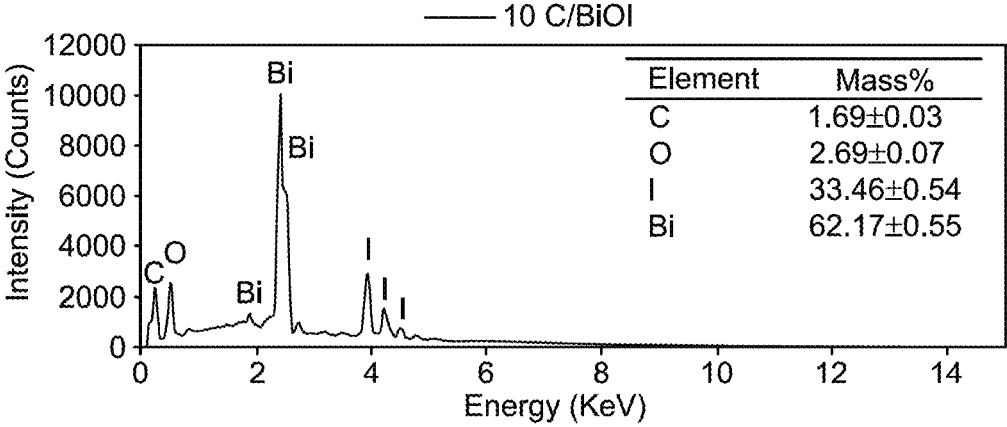
FIG. 6A shows energy dispersive x-ray (EDX) analysis of BiOI, according to certain embodiments.
Figure 6B:
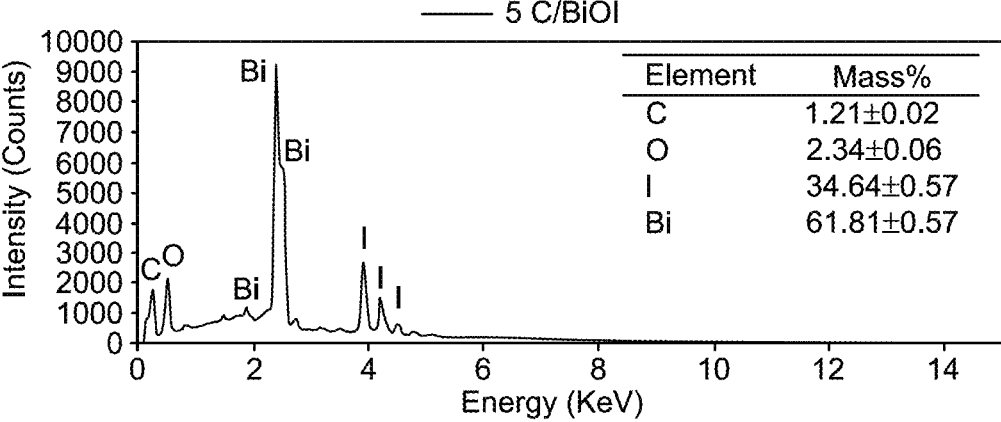
FIG. 6B shows EDX analysis of the 1C/BiOI nanocomposite, according to certain embodiments.
Figures 6C, 6D:
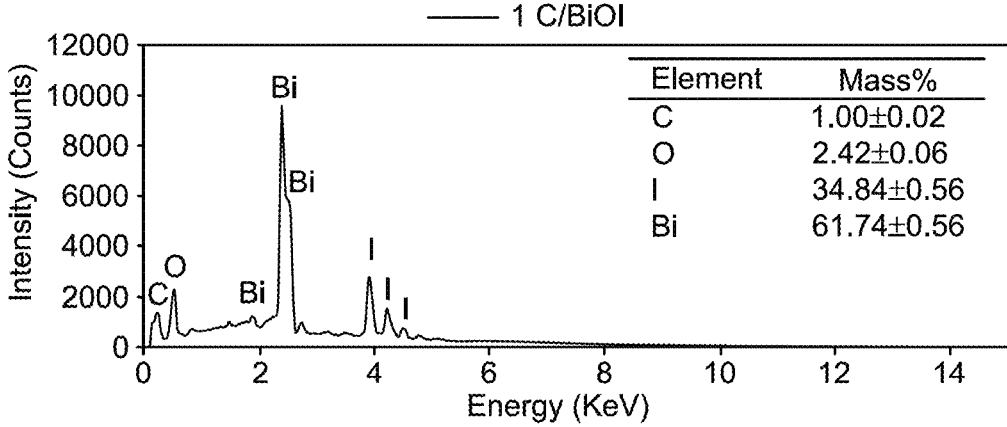
FIG. 6C shows EDX analysis of the 5C/BiOI nanocomposite, according to certain embodiments.
FIG. 6D shows EDX analysis of the 10C/BiOI nanocomposite, according to certain embodiments.

X-ray diffraction analysis was utilized to look into the phase structure of the BiOl and AcC nanocomposites. FIG. 2 displays the diffraction peaks of BiOl and its AcC composites at 2-theta degrees of 9.4, 19.3, 24.1, 31.5, 33.1, 36.6, 39.1, 45.2, 46.4, 49.7, 51.2, 54.9, 61.5, and 66.1, which correspond precisely to the planes (001), (002), (011), (102), (110), (111), (103), (004), (200), (104), (005), and (114) (ICDD 10-0445). The diffraction pattern provided evidence that the BiOI crystal structure is tetragonal. Additionally, the graphite phase planes (002) and (100) are responsible for the diffraction peaks at 26.7° and 43.5°, respectively, (JCPDS-65-6212), and the amplification of those peaks was proportional to the rise in AcC concentration. Additionally, Bragg's angles were utilized to find out the crystal magnitude via Debye-Scherer's expression (Equation (1)), while the lattice dimensions (a and c) imperfection was computed via Equations (2) and (3), respectively, and presented in Table 1.

$$D = \frac{0.9\lambda}{\beta\cos\theta} \tag{1}$$

$$a = \frac{\lambda}{\sqrt{3}\sin\theta} \quad\quad (2)$$

$$C = \frac{\lambda}{\sin\theta} \quad\quad (3)$$

TABLE 1

Crystal lattice, crystallite size, and lattice strain obtained from the XRD data.

| Sample | 2θ (Degree) | D (nm) | a (Å) | c (Å) |
|---|---|---|---|---|
| BiOI | 29.61 | 15.08 | 0.02273 | 0.60286 |
| 1 C/BiOI | 29.61 | 15.07 | 0.02272 | 0.60284 |
| 5 C/BiOI | 29.55 | 20.93 | 0.02268 | 0.60412 |
| 10 C/BiOI | 29.44 | 34.8 | 0.0226 | 0.60633 |

D, λ, and β denote the crystal size, wavelength, and the XRD peak width at half height (See: Almufarij, R. S.; Abdulkhair, B. Y.; Salih, M. Fast-simplistic fabrication of $MoO_3@Al_2O_3$—MgO triple nanocomposites for efficient elimination of pharmaceutical contaminants. Results Chem. 2024, 7, 101281).

Table 1 revealed a change in the main peak towards lower angles when the amount of carbon increases, suggesting a correlation between carbon and BiOI. Furthermore, as the concentration of carbon increases, the crystal's lattice size (a) slightly decreases while the value of c slightly increases, highlighting the robust interaction between carbon and BiOI.

The HRTEM analysis was employed to inspect the detailed morphology of the BiOI and its AcC nanocomposites and determine their overall particle sizes. FIGS. 3A-3D revealed particle size ranges of (20.0-69.3 nm), (32.2-36.7 nm), (11.7-29.4 nm), and (26.9-47.9 nm) for the BiOI, 1C/BiOI, 5C/BiOI, and 10C/BiOI, respectively. These results implied that the carbon doping doses served as a disunity agent that downsized the BiOI particles in the composites compared to the undoped BiOI. Those results indicated that the dose of carbon played an intermolecular spacer role since plentiful smaller BiOI nanoparticles were obtained within the nanocomposites. Additionally, selected area electron diffraction (SAED) was studied for deeper insight into the fabricated BiOI, 1C/BiOI, 5C/BiOI, and 10C/BiOI (FIGS. 4A-4D). The strong juxtaposition between the opaque perimeter and the luminous core of the spheres suggested a particle with hollow BiOI products. The SAED diffraction ring results were aligned with several principal planes revealed via the XRD (FIG. 4A-FIG. 4D). Furthermore, the HRTEM image of BiOI, 1C/BiOI, 5C/BiOI, and 10C/BiOI displayed well-defined lattice fringes with interplanar spacings allocated to the planes (110), (001), (302), and (102), respectively (FIG. 5A-FIG. 5D). These results were consistent with the tetragonal hollow BiOI nanosphere structures that can be manipulated via varying the Bi, I, and C proportions.

The elemental compositions of the pure BiOI and activated carbon-doped BiOI samples (1C/BiOI, 5C/BiOI, and 10C/BiOI) were evaluated via the EDX results and shown in FIG. 6A-FIG. 6D. It was observed that the BiOI sample reveals the presence of Bi, O, and I elements in addition to a minor peak associated with C. All doped samples have several peaks related to Bi, O, I in addition to the appearance of a peak attributed to C with increasing its intensity as the carbon content increases (BiOI; 0.92%, 1C/BiOI; 1%, 5C/BiOI; 1.21% and 10C/BiOI; 1.69%), as shown in the inset tables in FIG. 6A-FIG. 6D. The cause of this is strong interaction between carbon and the BiOI phase. For complementary and more accurate quantitative results, the compositions of samples are presented in FIG. 6A-FIG. 6D.

The X-ray photoelectron (XPS) spectra of BiOI, 1C/BiOI, 5C/BiOI, and 10C/BiOI were used to evaluate surface elements valence state and composition and interaction between the BiOI and carbon added. The XPS magnified spectra of Bi 4f, I 3d, O 1s, and C 1s of all samples were given in FIG. 7A-FIG. 7B and FIG. 8A-FIG. 8B. Two diffraction peaks are seen in the Bi 4f spectra of BiOI (FIG. 7A-FIG. 7B) at 159.58 and 164.68 eV, which are attributed to Bi $4f_{7/2}$ and Bi $4f_{5/2}$ of $[Bi_2O_2]^{2+}$, respectively. In contrast, the Bi 4f spectrum of 1C/BiOI, 5C/BiOI, and 10C/BiOI samples exhibit the same two diffraction peaks at (160.38 eV, 165.58 eV), (160.88 eV, 166.18 eV), and (159.78 eV, 164.88 eV), respectively. The Bi 4f peak centered at 159.58 eV of all carbon-doped samples slightly shift compared to BiOI (1C/BiOI, 0.8 eV; 5C/BiOI, 1.3 eV; and 10C/BiOI, 0.2 eV), while the peak at 164.68 eV shows a shift (1C/BiOI, 0.9 eV; 5C/BiOI, 1.5 eV; and 10C/BiOI, 0.2 eV), demonstrating how the interaction between carbon and BiOI is modifying the surface chemical environment of Bi. The peak of Bi $4f_{7/2}$ (or $4f_{5/2}$) peak could be decomposed into two bimodal peaks (FIG. 7A-FIG. 7B) for BiOI (158.74 eV and 159.93 eV) and (164.11 eV and 165.28 eV), 1C/BiOI, (158.95 eV and 160.55 eV) and (164.29 eV and 165.86 eV); 5C/BiOI (1159.74 e V and 161.05 eV) and (165.11 eV and 166.35 eV); and 10C/BiOI (159.4 eV and 160.45 eV) and (164.69 e V and 165.76 eV), which could be attributed to $Bi^{3+}$ and $Bi^{5+}$, respectively. These findings suggested the presence of the $Bi_3O_5I_2$ phase besides the BiOI phase. It was observed that the intensities of the peaks related to $Bi^{+5}$ observed in the spectrum of 10C/BiOI decreased, suggesting a decrease in the $Bi_3O_5I_2$ phase compared to BiOI. The I 3d spectra of BiOI, as displayed in FIG. 7A-FIG. 7B, have two peaks at 618.98 and 630.38 eV corresponding to I $3d_{5/2}$ and I $3d_{3/2}$, respectively. These peaks may represent the (−1) oxidation state of I elements in BiOI. The I 3d peaks of 1C/BiOI shift to 619.59, and 630.97 eV, of 5C/BiOI shift to 619.47, and 630.88 eV, and of 10C/BiOI shift to 620.94 and 631.39 eV when compared to those of pure BiOI. This shift may be caused by the interaction of BiOI with carbon.

Figure 7A:
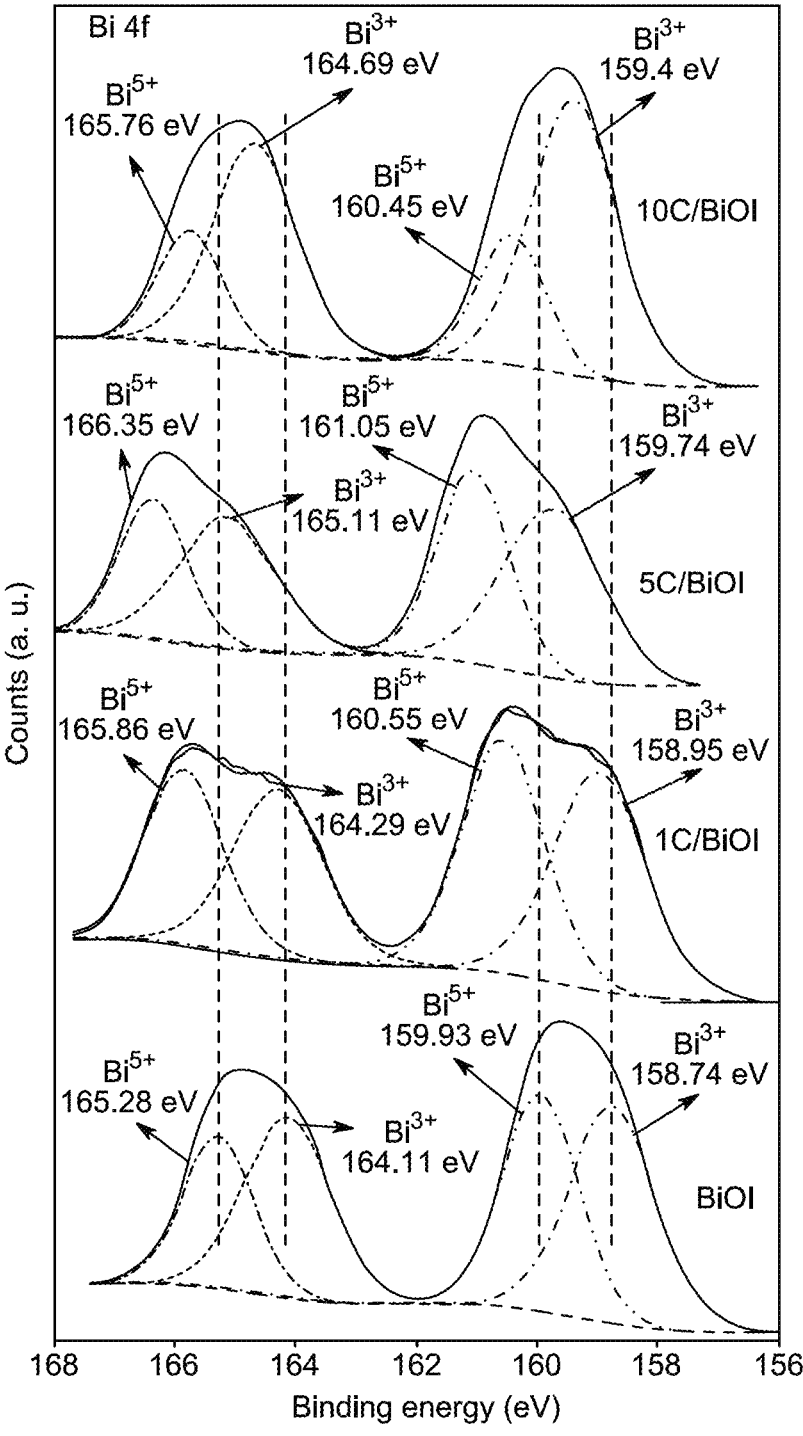
FIG. 7A shows deconvoluted high-resolution X-ray photoelectron spectroscopy (XPS) spectra of Bi 4f of the BiOI, 1C/BiOI, 5C/BiOI, and 10C/BiOI nanocomposites, according to certain embodiments.
Figure 7B:
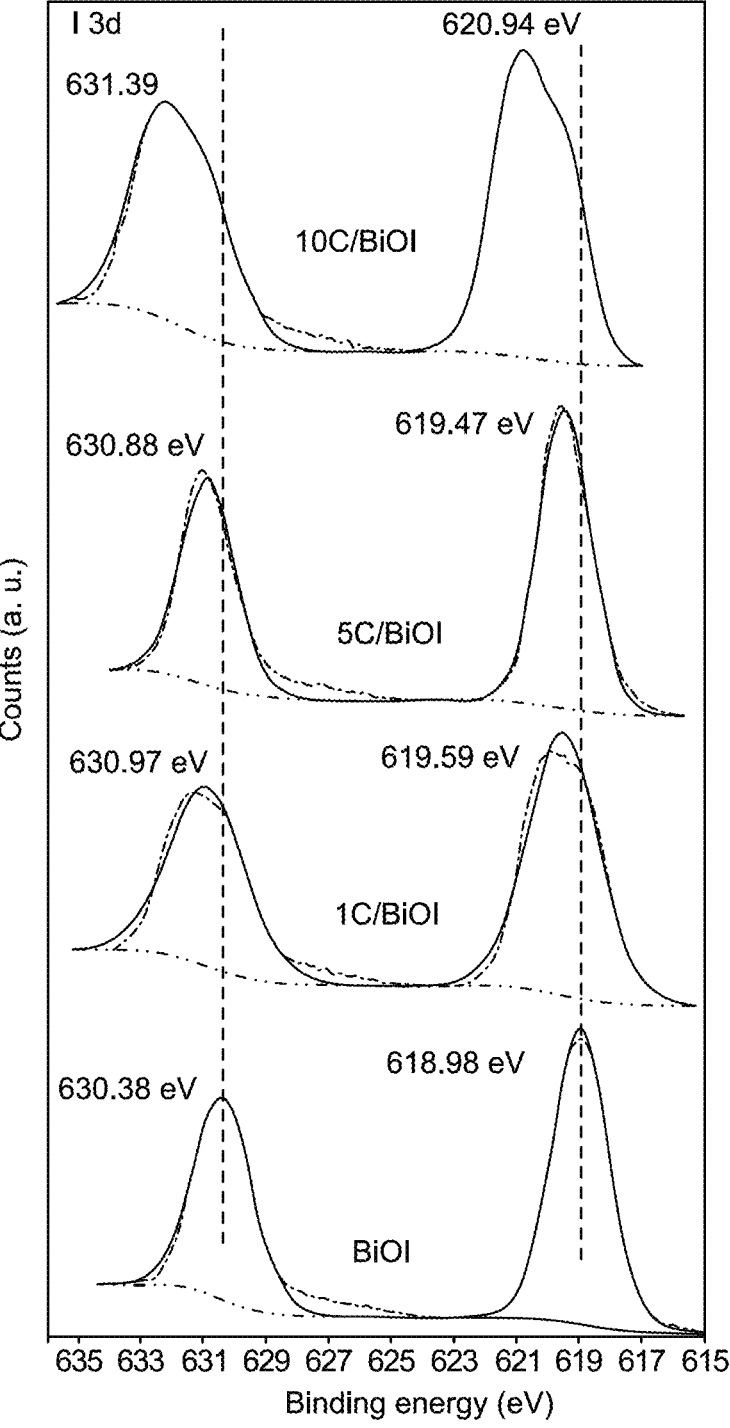
FIG. 7B shows deconvoluted high-resolution XPS spectra of I 3d of Bi 4f of the BiOI, 1C/BiOI, 5C/BiOI, and 10C/BiOI nanocomposites, according to certain embodiments.
Figure 8A:
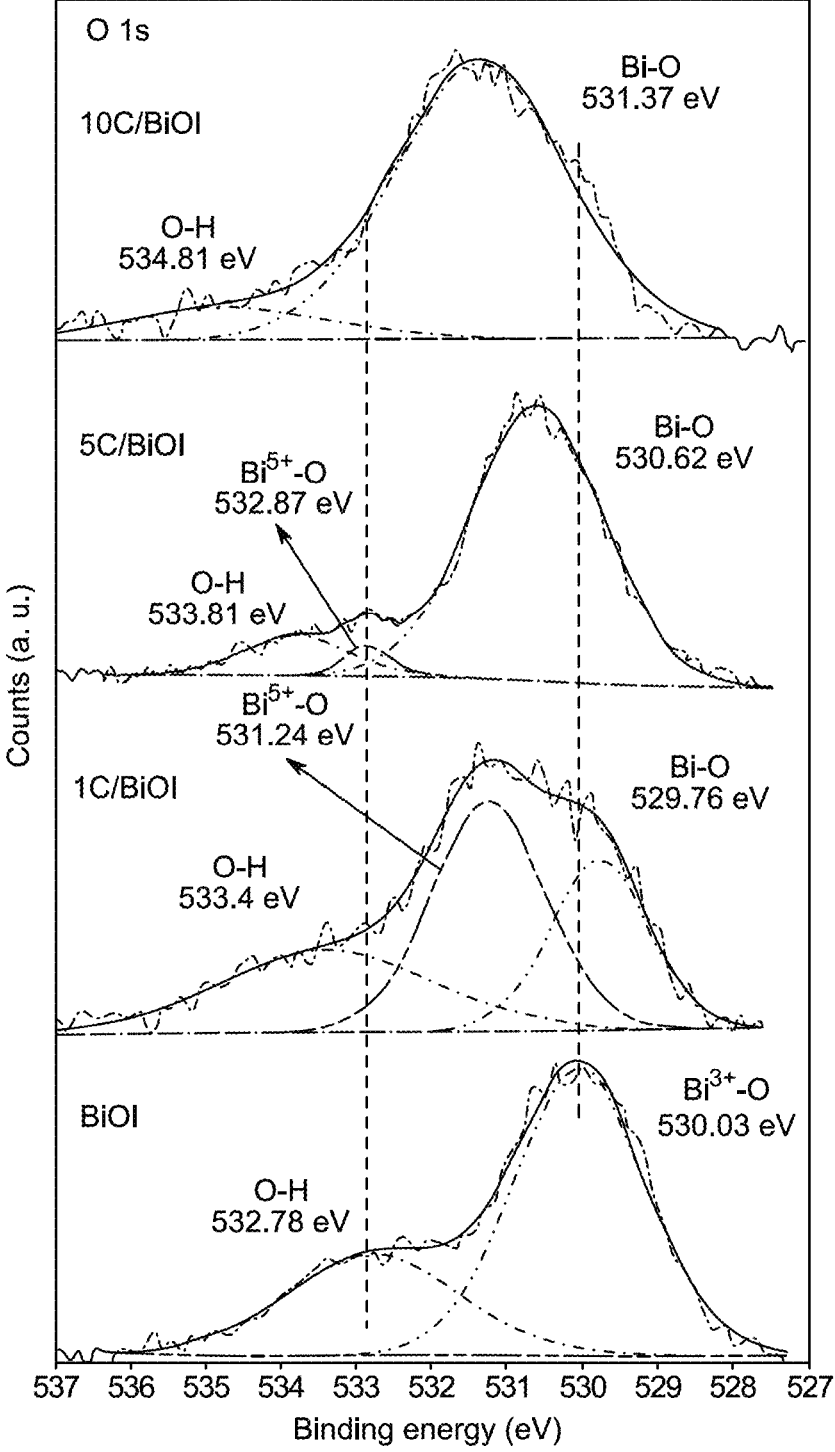
FIG. 8A shows deconvoluted high-resolution XPS spectra of O 1s of the BiOI, 1C/BiOI, 5C/BiOI, and 10C/BiOI nanocomposites, according to certain embodiments.
Figure 8B:
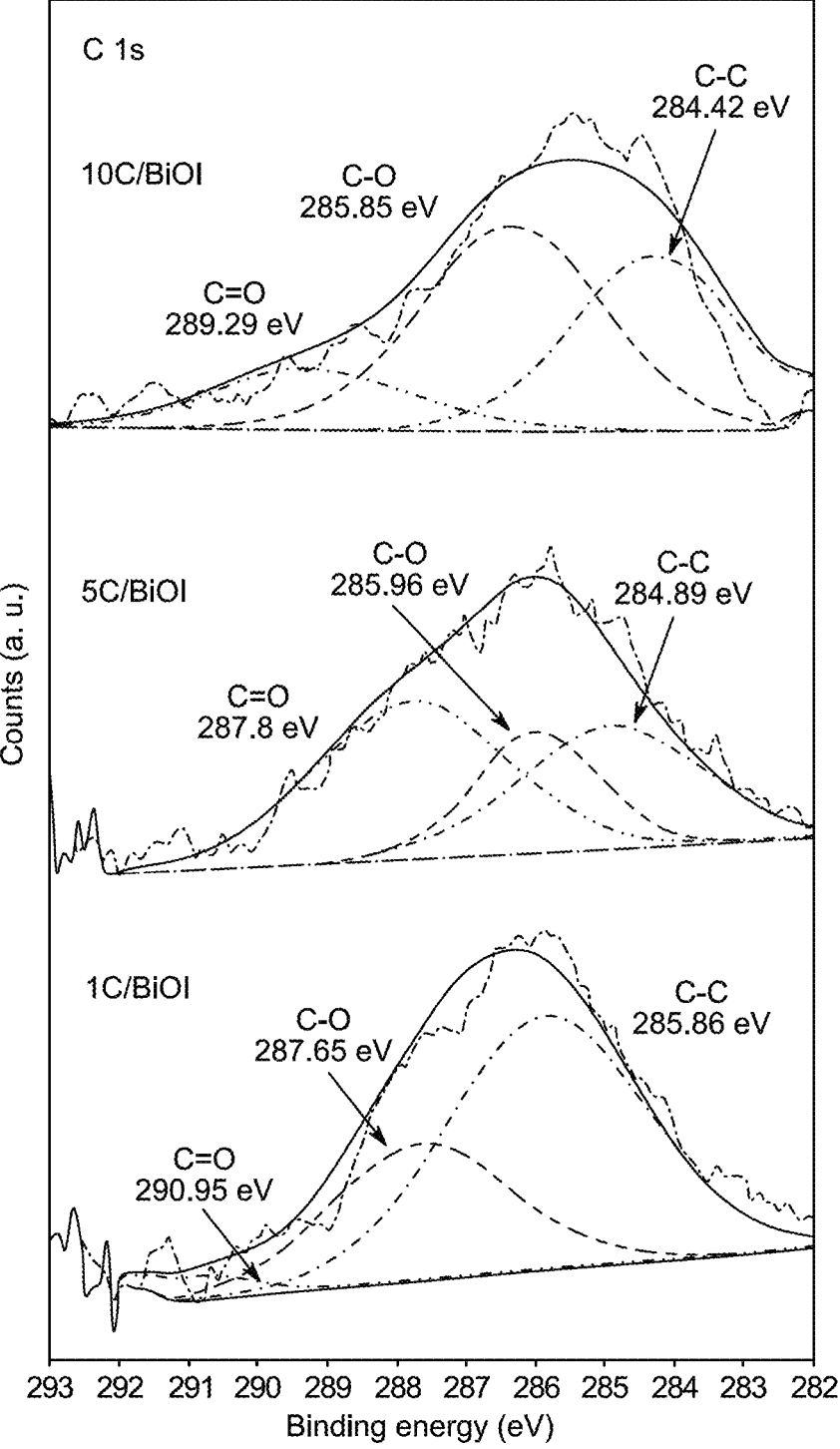
FIG. 8B shows deconvoluted high-resolution XPS spectra of C Is of the BiOI, 1C/BiOI, 5C/BiOI, and 10C/BiOI nanocomposites, according to certain embodiments.

The O1s spectra (FIG. 8A-FIG. 8B) of BiOI 1C/BiOI, 5C/BiOI, and 10C/BiOI at 530.03 eV, 529.76 eV, 530.62 eV, and 531.37 eV, respectively, are attributed to $Bi^{3+}$—O bonds of $[Bi_2O_2]_2$ existing in BiOI. The O1s spectra (FIGS. 8A-8B) of BiOI, 1C/BiOI, 5C/BiOI, and 10C/BiOI at 532.78 eV, 533.4 eV, 533.81, and 534.81 eV, respectively, are attributed to O—H bonds on the surface of BiOI. Furthermore, the peaks at 531.24 eV and 532.87 eV of 1C/BiOI and 5C/BiOI, respectively, correspond to the $Bi^{5+}$—O bonds in the $Bi_3O_5I_2$ lattice. These peaks disappeared in 10C/BiOI, which could be attributed to decreasing $Bi_3O_5I_2$ phases, as confirmed by the XPS spectrum of Bi 4f of 10C/BiOI (FIG. 7A-FIG. 7B). It was observed that, by increasing the carbon content, there are somehow shifts in all peaks of O 1s (FIG. 8A-FIG. 8B), demonstrating the carbon and BiOI interaction.

The C1s spectra (FIG. 8A-FIG. 8B) observed in 1C/BiOI can be divided into three different peaks. The binding energies at 285.86, 287.65, and 290.95 eV correspond to C—C, C—O, and C=O. The absence of a minor peak in the C 1s spectrum at a lower binding energy of roughly ≈281-

283 eV and the absence of two peaks in the Bi 4f spectrum at ≈157 and 162 eV, respectively, indicating that there is no Bi—C bond. On increasing carbon content, the C 1s peaks of 5C/BiOI shift to 284.89 and 285.96 eV and 287.8 eV and of 10C/BiOI shift to 284.42 and 285.85 eV and 289.29 eV, indicating the surface chemical environment changing of Bi due to the strong interaction between carbon and BiOI. From the above results, it can be concluded that there is a good interaction between carbon and BiOI, in addition to the formation of the $Bi_3O_5I$ phase beside BiOI.

At temperatures between 303 and 428 K, direct current (dc) and alternating current (AC) was used to examine the electrical characteristics of our samples. When a conducting C/BiOI pellet positioned between two inert electrodes, its entire length experiences a unidirectional electric charge flow, known as dc conductivity. The AC approach differentiates between various mechanisms that contribute to a material's overall conductivity response, such as grain conduction, grain boundary conduction, and electrode response, in contrast to the DC method, which gives a sample's global response.

Figure 9:
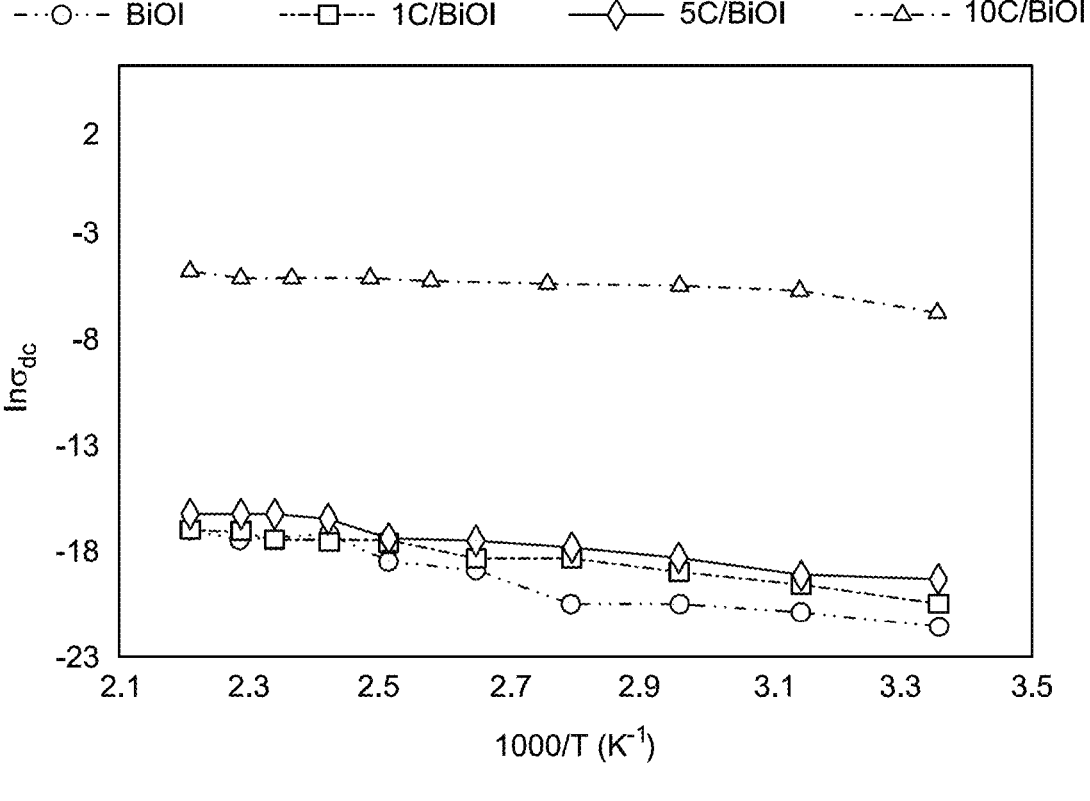
FIG. 9 is a graph depicting the effect of temperature on the DC-conductivity of the BiOI, 1C/BiOI, 5C/BiOI, and 10C/BiOI nanocomposites, according to certain embodiments.
Figure 10A:
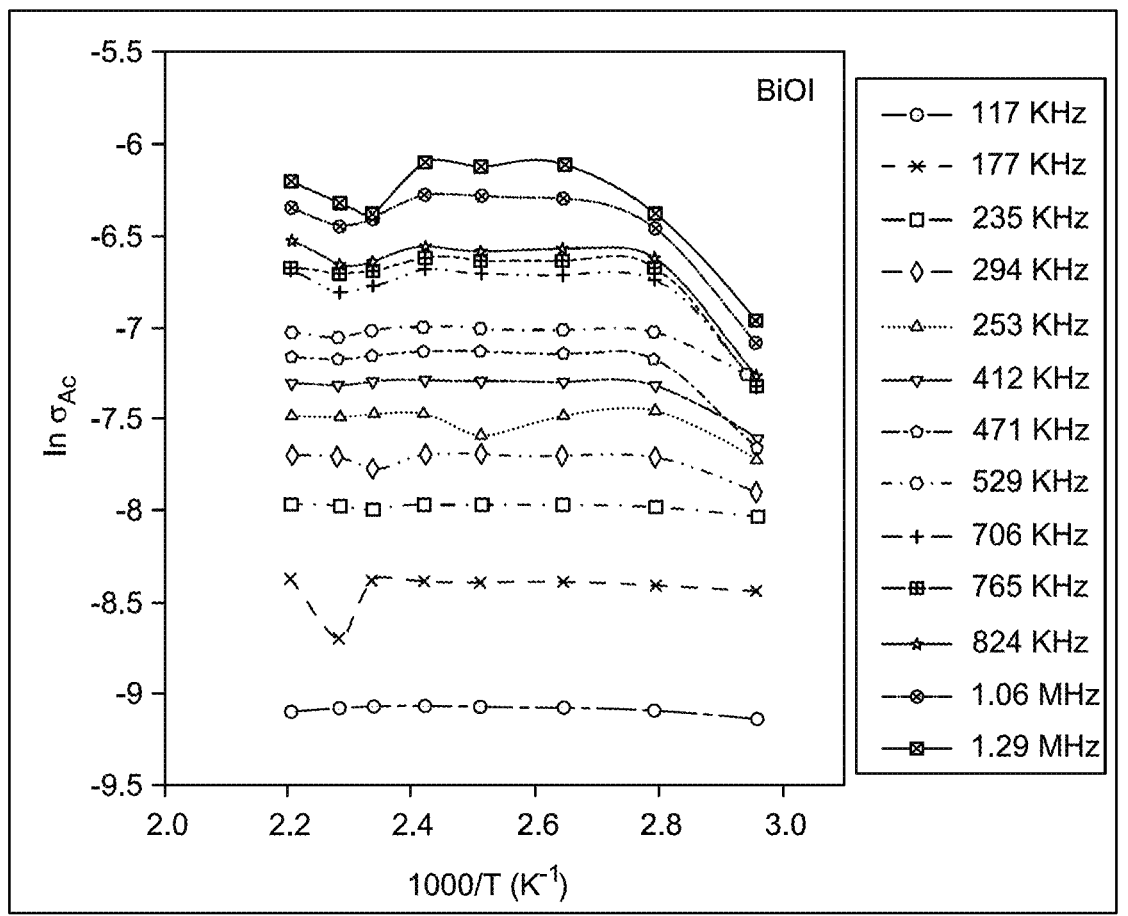
FIG. 10A is a graph depicting the effect of temperature on the AC conductivity at various frequencies of the BiOI, according to certain embodiments.
Figure 10B:
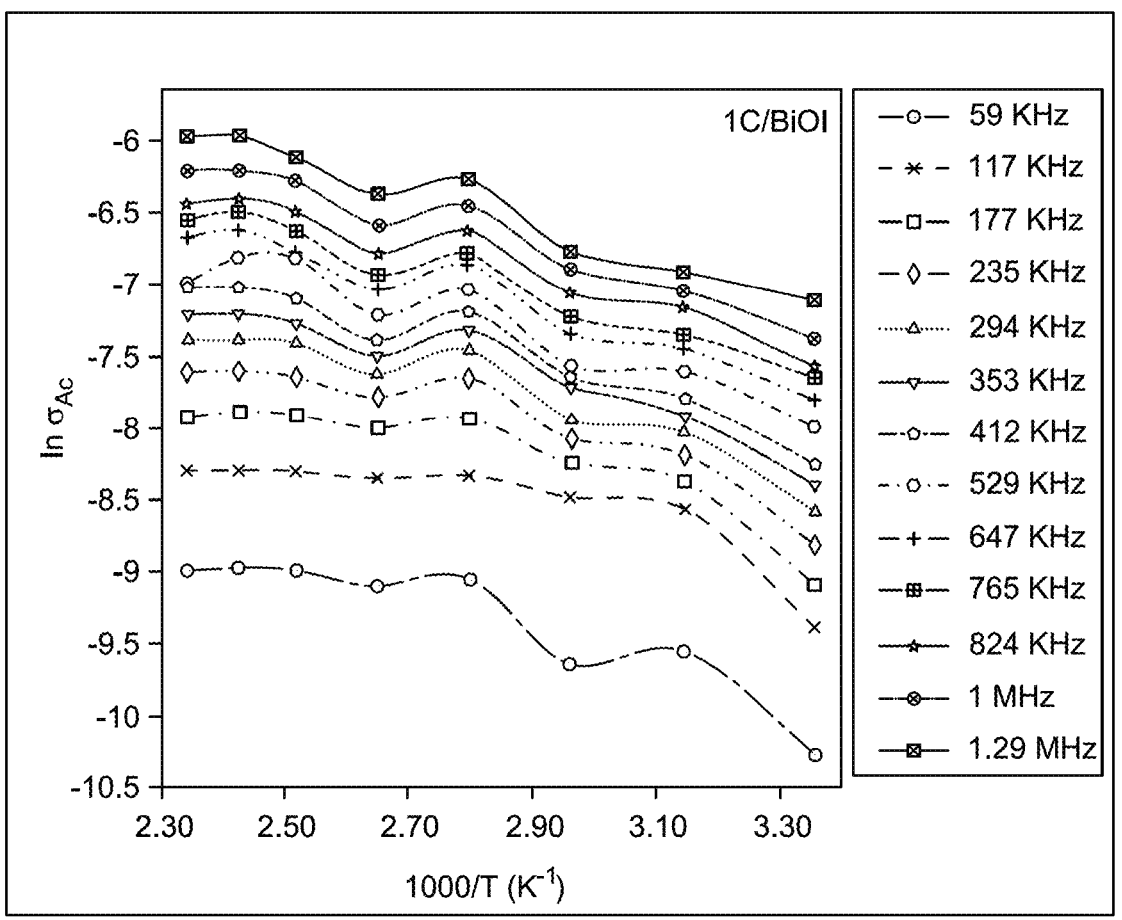
FIG. 10B is a graph depicting the effect of temperature on the AC conductivity at various frequencies of the 1C/BiOI nanocomposite, according to certain embodiments.
Figure 10C:
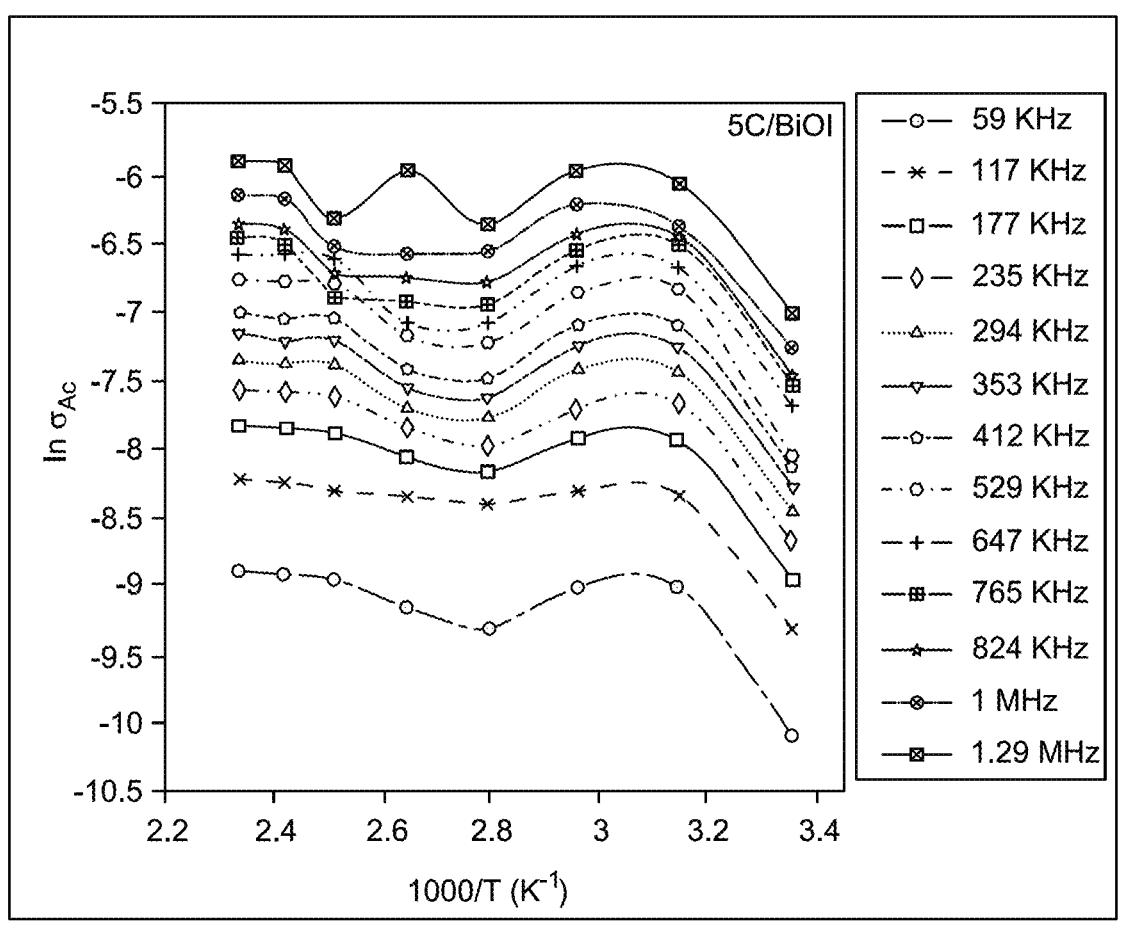
FIG. 10C is a graph depicting the effect of temperature on the AC conductivity at various frequencies of the 5C/BiOI nanocomposite, according to certain embodiments.
Figure 10D:
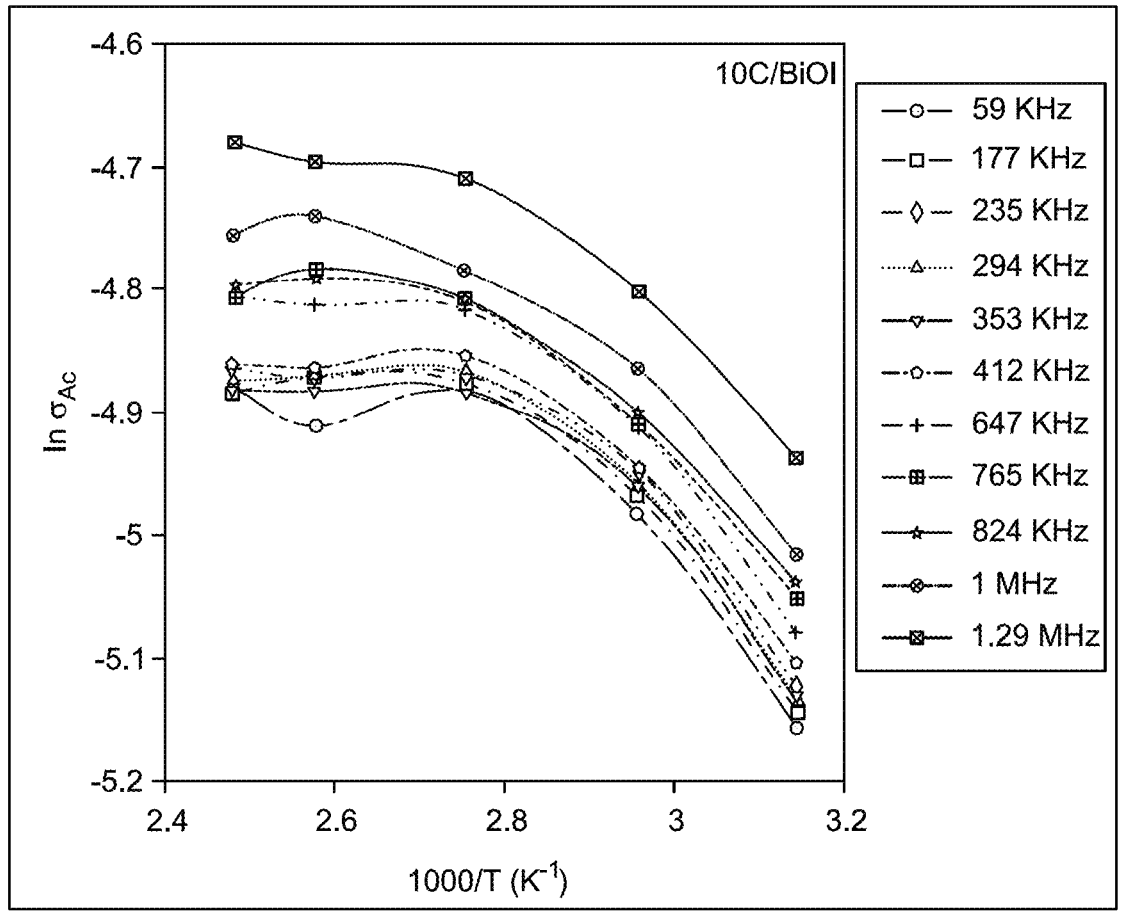
FIG. 10D is a graph depicting the effect of temperature on the AC conductivity at various frequencies of the 10C/BiOI nanocomposite, according to certain embodiments.

FIG. 9 shows the temperature dependency of dc conductivity ($\sigma_{dc}$) for every sample. The conductivity increases as the temperature increases, indicating the semiconductor behavior. The electrical conductivity followed the Arrhenius equation (Equation (4)), which governs electrical conduction.

$$\sigma_{dc} = \sigma_{o,dc}\exp\left(\frac{E_{a,dc}}{K_bT}\right) \qquad (4)$$

Here, $\sigma_{o,dc}$ stands for the pre-exponential factor, $E_{a,dc}$ for the activation energy under the $d_c$ field, and $K_b$ for Boltzmann's constant. Table 2 lists the dc conductivity values that were determined by calculating the slope of the linear fit of Arrhenius plots. The conductivity increases in 10C/BiOI>5C/BiOI>1C/BiOI>BiOI. Ea ranged from 0.011 to 0.037 eV for all samples. The 10C/BiOI has the lowest activation energy, indicating the ease with which electric current is passed through, thus increasing its electrical conductivity.

Costa, B. Electrical conductivity and dielectric properties of Sr doped M-type barium hexaferrite BaFe12O19. *RSC Adv.* 2021, 11, 1531-1542). The slopes for straight lines follow the following relation Equation (5):

$$\sigma_{ac} = \sigma_{o,AC}\exp\left(\frac{E_{a,AC}}{K_bT}\right) \qquad (5)$$

where $\sigma_{o,AC}$ is specific conductivity and $E_{a,AC}$ is the ac activation energy.

The conductivity was found to rise as the temperature rose, indicating the semiconductor behavior of all samples. The activation energy was calculated and is presented in Table 2 at selected frequencies.

Figure 11:
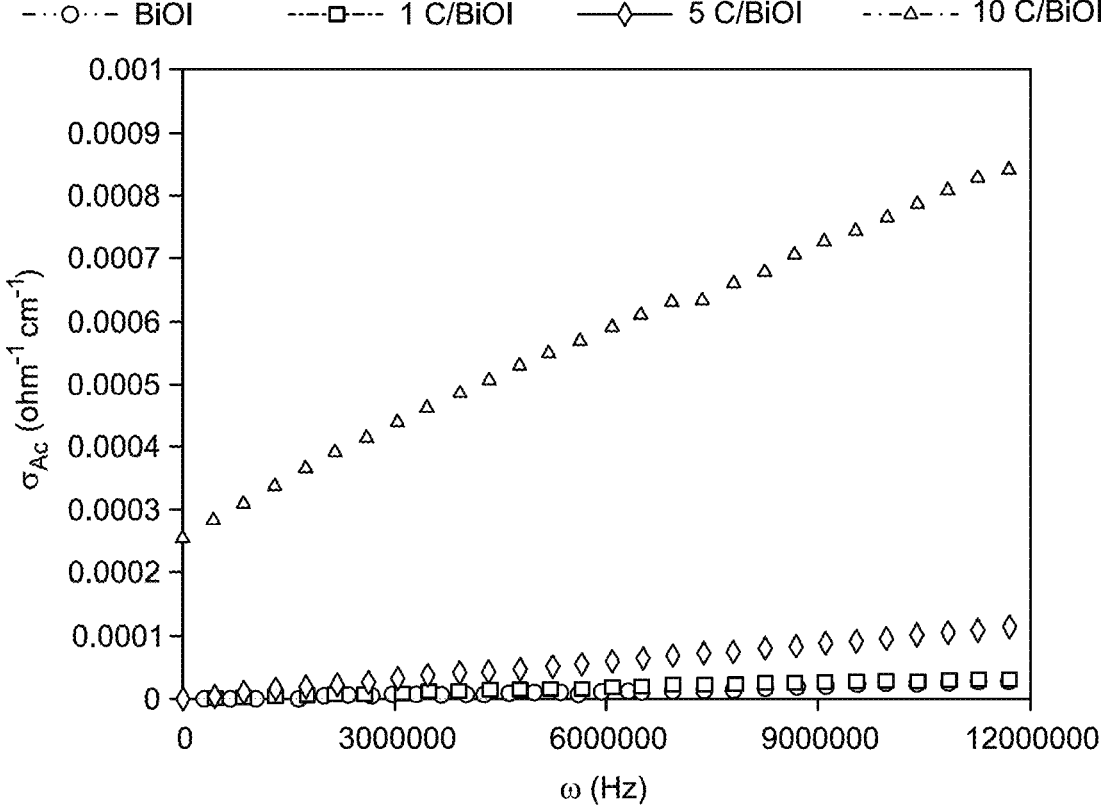
FIG. 11 is a graph depicting the effect of frequency on AC conductivity of the BiOI, 1C/BiOI, 5C/BiOI, and 10C/BiOI nanocomposites, according to certain embodiments.

The AC approach differentiates between various mechanisms contributing to the total conductivity of a material, such as grain conduction, grain boundary conduction, and electrode response. FIG. 11 displays the frequency dependence of AC conductivity for the materials under investigation at room temperature. The following relation is used to calculate each sample's ac conductivity (Equation (6)) [See: Modwi, A.; Taha, K. K.; Khezami, L.; Al-Ayed, A. S.; Al-Duaij, O.; Khairy, M.; Bououdina, M. Structural and electrical characterization of Ba/ZnO nanoparticles fabricated by co-precipitation. *J. Inorg. Organomet. Polym. Mater.* 2020, 30, 2633-2644]:

$$\sigma_{ac} = \varepsilon'\varepsilon_0\omega \tan \delta \qquad (6)$$

where to: vacuum permittivity, $\varepsilon'$: dielectric constant, and Tan $\delta$: the loss tangent.

FIG. 11 demonstrates that the AC conductivity of all samples rises as the frequency increases, suggesting a semiconducting behavior in line with tiny polaron hopping. Materials with conduction bands originating from unoccupied or "f" orbitals create small polarons. Table 2 summarizes the AC conductivity results. The liberation of charge carriers trapped in confined spaces may cause an increase in conductivity levels at high frequencies, the impact of the applied field's force, and the heightened migration and movement of the liberated charge carriers among various

TABLE 2

The $\sigma_{dc}$, $E_{a,dc}$, $E_{a,AC}$, s, and A values and the values of $\sigma_{ac}$, dielectric constant at 70 KHz for the investigated samples.

| Sample | s | A | $\sigma_{dc}$ (ohm$^{-1}$·cm$^{-1}$) | $\sigma_{ac}$ (ohm$^{-1}$·cm$^{-1}$) | Dielectric Constant | Z (Ohm) | $E_{a,dc}$ (eV) | $E_{a,AC}$ (eV) 177 KHz | $E_{a,AC}$ (eV) 1.29 MHz |
|---|---|---|---|---|---|---|---|---|---|
| BiOI | 0.89 | $1.31 \times 10^{-11}$ | $2.23 \times 10^{-9}$ | $1.1 \times 10^{-5}$ | 7.56 | $156 \times 10^3$ | 0.037 | 0.005 | 0.057 |
| 1C/BiOI | 0.81 | $7.24 \times 10^{-11}$ | $1.09 \times 10^{-9}$ | $2.3 \times 10^{-5}$ | 8.5 | $130 \times 10^3$ | 0.025 | 0.05 | 0.106 |
| 5C/BiOI | 0.84 | $1.58 \times 10^{-10}$ | $3.47 \times 10^{-9}$ | $7.1 \times 10^{-5}$ | 14.47 | $85 \times 10^3$ | 0.026 | 0.011 | 0.008 |
| 10C/BiOI | 0.37 | $2.15 \times 10^{-6}$ | $5.56 \times 10^{-9}$ | $2.86 \times 10^{-5}$ | 34.55 | $52 \times 10^3$ | 0.011 | 0.059 | 0.05 |

FIG. 10A-FIG. 10D shows the plots of $\ln\sigma_{ac}$ vs. 1000/T at chosen frequencies. All the samples demonstrated how conductivity rose with temperature. This does not suggest a rise in charge concentration but is explained by the greater mobility of charge carriers (See: Hou, J.; Jiang, K.; Shen, M.; Wei, R.; Wu, X.; Idrees, F.; Cao, C. Micro and nano hierachical structures of BiOI/activated carbon for efficient visible-light-photocatalytic reactions. *Sci. Rep.* 2017, 7, 11665. And Marouani, Y.; Massoudi, J.; Noumi, M.; Benali, A.; Dhahri, E.; Sanguino, P.; Graca, M. P. F.; Valente, M. A.;

locations. Freed charge carriers and electron mobility among many metal ions are factors in the conduction behavior of the material.

The AC conductivity measurements in Table 2 and FIG. 11 demonstrate how carbon doping contributes to higher conductivity levels. The conductivity value was increased by increasing the carbon amount reach to 255 times for 10C/BiOI samples ($2.86\times10^{-4}$ ohm$^{-1}$·cm$^{-1}$) compared to pure BiOI samples. In order to preserve system neutrality, carbon doping causes oxygen (IV) atoms to replace oxygen (II) atoms, resulting in oxygen defects. As a result, the rise in doping concentration causes an increase in oxygen defects. These native point defects function as shallow donors, enhancing wettability, raising carrier density (enhancing conductivity), and revealing additional active sites.

Creating these neutral defects lowers the height barrier of the grain boundary at the interface, facilitating the flow of charge carriers and increasing conductivity. Moreover, it is thought that carbon doping promotes the development of a more efficient charge-transfer system, enhancing the conductivity of samples doped with carbon. The variation in the AC conductivity values of 10C/BiOI compared to other samples may also be attributed to decreasing the $Bi_3O_5I_2$ phase as confirmed by XPS results, which reveals a decrease in the peaks related to $Bi^{5+}$ (FIG. 7A-FIG. 7B) compared to the other samples, as well as the disappearance of $Bi^{5+}$—O peak in FIG. 8A-FIG. 8B related to 10 C/BiOI. This also indicates a large gap in the electronic state between 10C/BiOI and other doped samples. Materials used in semiconductors have the following frequency-dependent relationship (Equation (7)):

$$\sigma_{AC}(\omega)=A\omega^s \qquad (7)$$

where A and s are constants.

A sudden hopping of the charge carriers results in translational motion if s<1, while a localized hopping of the species is indicated by s>1. The effect is caused by the relaxation resulting from the movement of electrons or atoms by tunneling or hopping between equilibrium locations. The exponent s is determined by graphing the natural logarithm of $\sigma_{AC}(\omega)$ against the natural logarithm of $(\omega)$, as depicted in FIG. 12A-FIG. 12B.

The values range from 0.37 to 0.89 (Table 2), indicating that correlated barrier hopping (CBH) is the most likely mechanism in the samples under investigation. In general, the relation between the conduction mechanism and s(T) behavior might suggest a suitable model of the conduction mechanism. According to research, there are two mechanisms for transferring charge carriers (electrons or ions): classical hopping over a potential barrier and quantum mechanical tunneling, or a combination of both. The Correlated Barrier Hopping (CBH) model is the right one when the exponent "s" decreases as the temperature rises. The quantum mechanical tunneling (QMT) model is the most appropriate since the exponent "s" (equal to 0.8) is either slightly increased with temperature or is essentially constant.

Figure 12A:
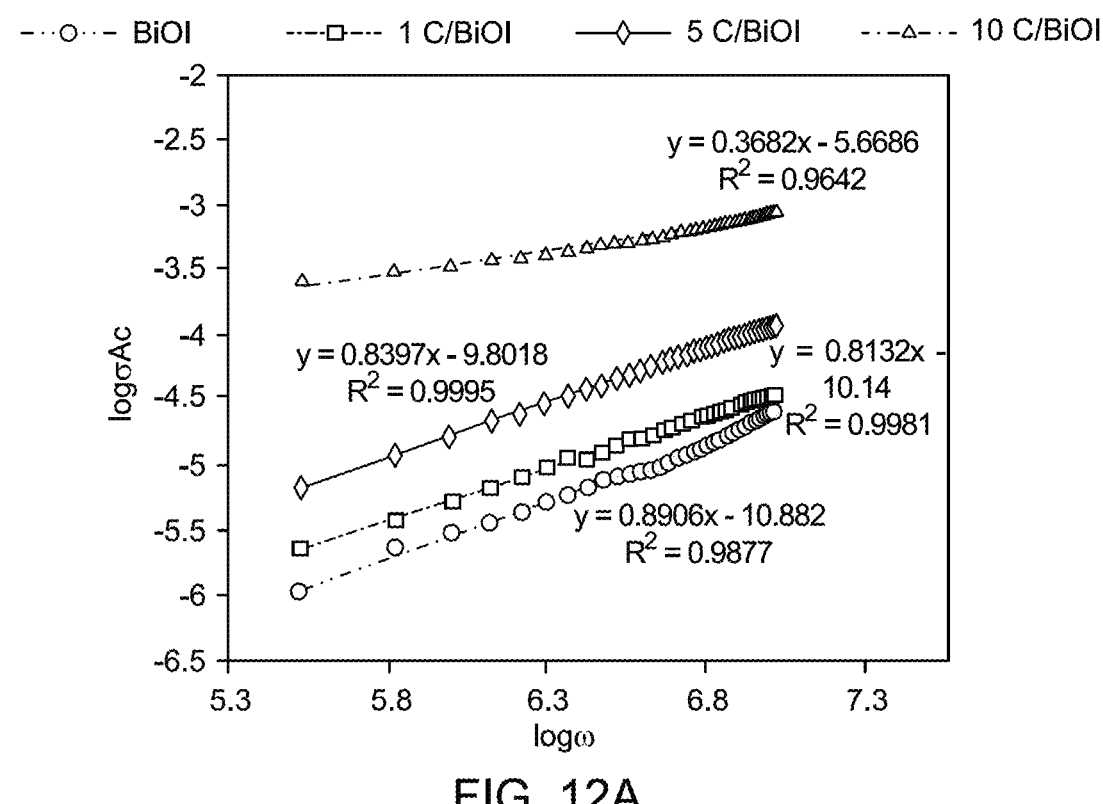
FIG. 12A is a graph depicting AC conductivity frequency dependence in the BiOI, 1C/BiOI, 5C/BiOI, and 10C/BiOI nanocomposites, according to certain embodiments.
Figure 12B:
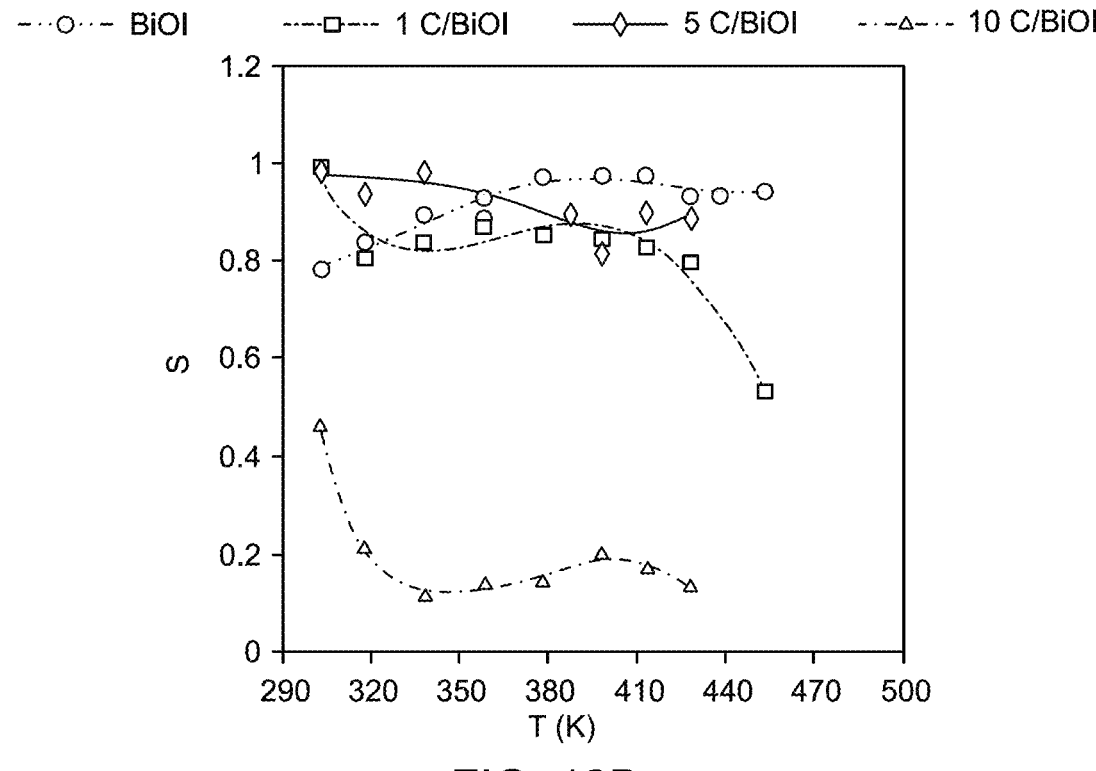
FIG. 12B is a graph depicting the effect of temperature on "s" parameter for the BiOI, 1C/BiOI, 5C/BiOI, and 10C/BiOI nanocomposites, according to certain embodiments.

In order to ascertain the suitable mechanism for the conductivity of the C/BiOI composites, the variation of the exponent "s" concerning temperature is depicted in FIG. 12A-FIG. 12B. It was found that for all carbon-doped BiOI samples, "s" gradually drops with rising temperatures. This behavior agrees with the Correlated Barrier Hopping (CBH) model. On the other hand, the pure BiOI sample shows a steady increase in "s" as the temperature rises, indicating that the best explanation for the conduction mechanism is quantum mechanical tunneling (QMT).

Figure 13:
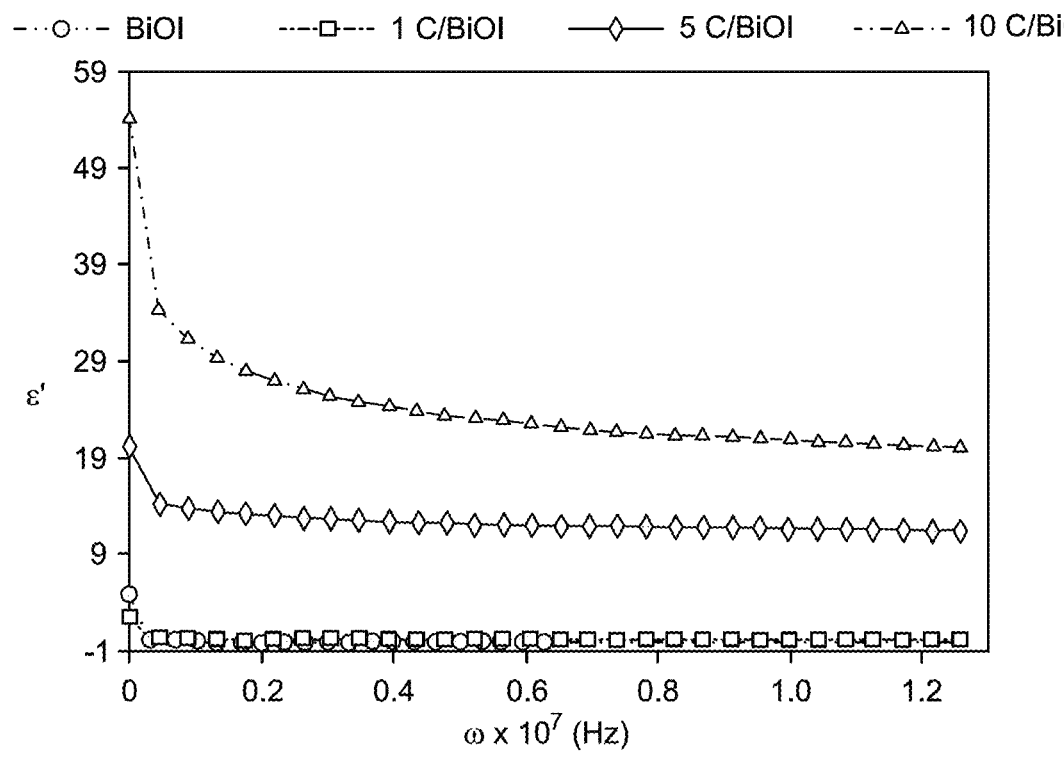
FIG. 13 is a graph depicting frequency dependence of dielectric constant in the BiOI, 1C/BiOI, 5C/BiOI, and 10C/BiOI nanocomposites, according to certain embodiments.

The frequency dependence of the $\varepsilon'$ for the examined samples at room temperature is represented in FIG. 13, which shows a dispersion in $\varepsilon'$-values as the frequency increases. At lower frequencies, the decline in $\varepsilon'$-values occurs very quickly, whereas at higher frequencies, approaching a constant value takes longer. The dielectric constant exhibits a notable enhancement owing to carbon doping, as observed from the curves. All carbon doped BiOI samples display higher dielectric constant values (Table 2) at a lower frequency than pure BiOI (7.56 at 70 KHz). As a result of this carbon doping, oxygen defects would result from substituting carbon (IV) atoms for oxygen (II) atoms, throwing off the overall charge of the system and preventing system neutrality. As a result, doping concentration rises, and more oxygen deficiency exists. These native point defects then function as donors, who are accountable for enhancing the dielectric conduction process of free charge carriers. Numerous interfaces are created during the doping process, which advances the formation of charge carriers on the interior surface of the C/BiOI lattice and ultimately results in higher dielectric constant values. The high dielectric constant is mostly due to space charge polarization, prevalent in heterogeneous structures of various regions, such as grain and grain borders. The conductivity of the grain is deemed greater to that of the grain border. Because of this, charge carriers experience varying resistances, accumulating charges at the borders and increasing the dielectric constant value. The Maxwell-Weigner model clarifies the dielectric properties of a homogeneous double layer. According to the model, a dielectric material consists of good conducting grains isolated by poorly or resistive conducting borders. Subsequently, as an external electric field is applied, the charge carriers get effortlessly transferred from the grains but will still be assembled at the grain boundaries. Thus, this process creates large polarization and high dielectric constants in semiconductors.

Figure 14:
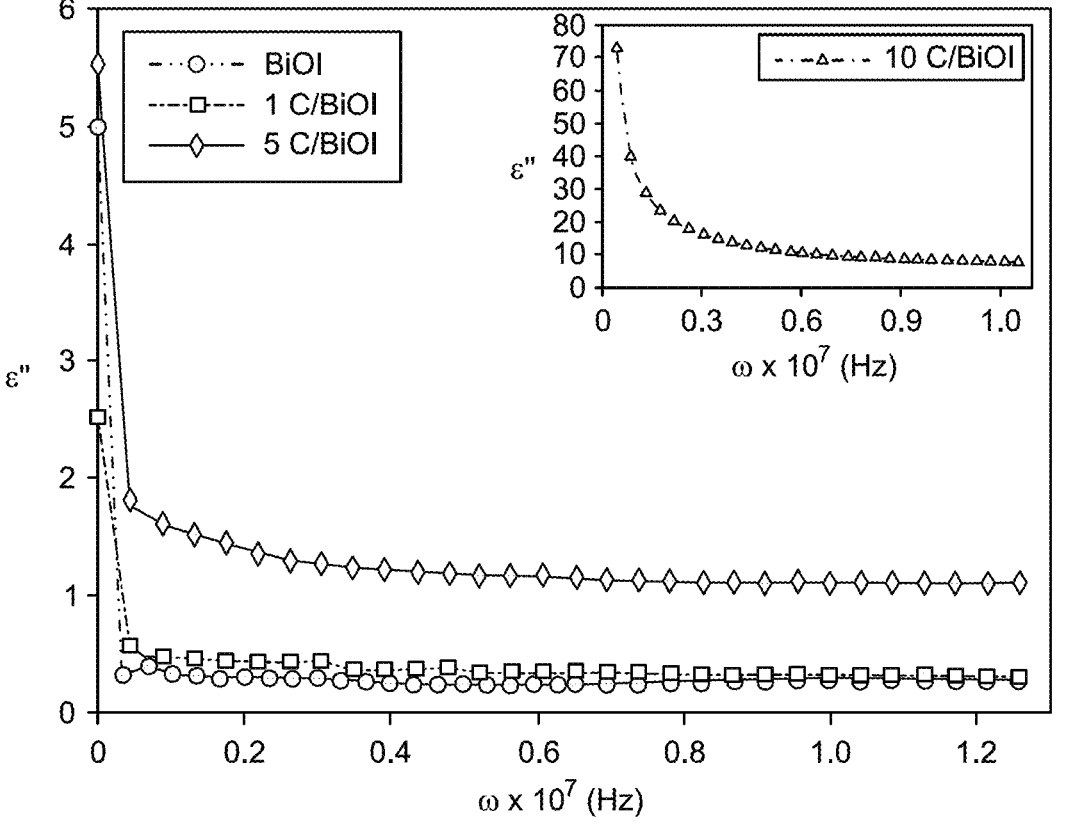
FIG. 14 is a graph depicting frequency-dielectric loss ($\varepsilon''$) correlation for the BiOI, 1C/BiOI, 5C/BiOI, and 10C/BiOI nanocomposites, according to certain embodiments.

The dielectric loss specifies the quantity of energy lost due to charge carrier movement. The fluctuation of $\varepsilon''$ as a function of frequency at room temperature is displayed in FIG. 14. The behavior obtained is comparable to that of the real part of the dielectric constant, i.e., it decreases as the frequency increases. The $\varepsilon''$-value rapidly drops in the low-frequency region while it remains low in the high-frequency region. This trend can be elucidated by the fact that in the low-frequency region where the samples possess higher resistivity (because of the grain boundary), additional energy is needed to hop the charges between the cations; thus, the loss is high. In the high-frequency region, where the samples have low resistivity (due to grains), less energy is involved in hopping the charges between the cations at the octahedral sites. The polarization of space charges may potentially cause a decrease in dielectric loss as the frequency increases.

Figure 15:
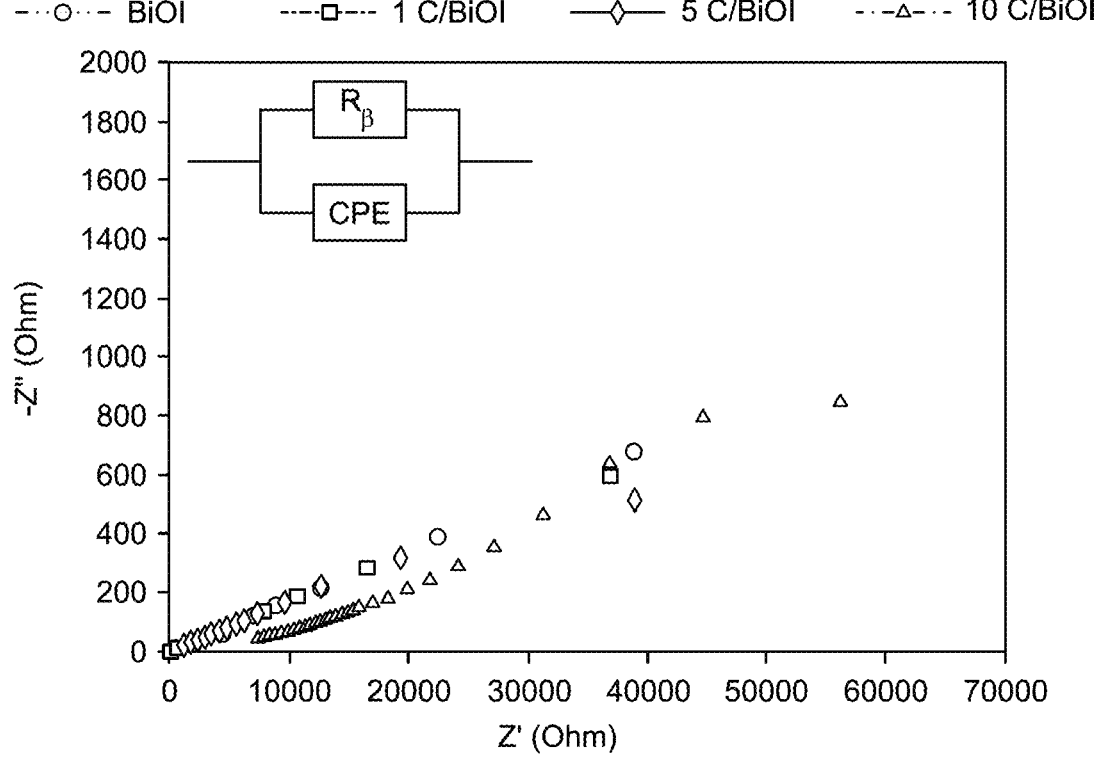
FIG. 15 depicts Nyquist ($Z''–Z'$) plots of the BiOI, 1C/BiOI, 5 C/BiOI, and 10C/BiOI nanocomposites at room temperature, according to certain embodiments.

Impedance spectroscopy is a practical and effective method for establishing the relationship between the electrical characteristics and microstructures of substrates. Generally, the electrochemical impedance spectroscopy (EIS) spectra show distinct semicircles in complex impedance planes as they possess diverse relaxation times. The impedance responses caused by the grain border and the grain itself may overlap if the variation in time constants among the processes are less than one hundred. FIG. 15 demonstrates the complex impedance spectra for the investigated samples, from which it can be observed that the complex impedance spectra for BiOI and 1C/BiOI samples show only one semicircular arc corresponding to the grain boundary, suggesting that the resistance at the grain boundary is quite high in each sample. The increased surface-to-volume ratio, growing porosity, and greater disorder atomic arrangement could cause the high value of the grain boundary resistance. Instead of showing whole semicircles, the data in the impedance graphs show half semicircles. Since the center of semicircles lies below the abscissa axis, all samples exhibit non-Debye-type dielectric relaxation. The semicircle radius differs because the pure BiOI and 1C/BiOI samples have different resistances. On the other hand, on increasing the carbon content to 5% and 10%, the semicircle almost disappeared, and only inclined lines were observed, suggesting that only resistive component of the 5C/BiOI and 10C/BiOI composites exists. As observed from Table 1, the resistance of doped samples is lower than that of pure BiOI. The resistance decreases with increasing activated carbon content, which indicates carbon's effective role in increasing the conductivity of 5C/BiOI and 10C/BiOI nanocomposites. The electrical conductivity of 10C/BiOI nanocomposites with the highest conductivity was compared with the electrical conductivity of other systems and is presented in Table 3. It was found that our composite possesses higher conductivity than others.

TABLE 3

Comparison of electrical conductivity of 10 C/BiOI nanocomposites with other systems.

| Sample | $\sigma_{ac}$ (ohm$^{-1}$ · cm$^{-1}$) | Ref |
|---|---|---|
| BiOI thin films | $0.125 \times 10^{-4}$ | Barroso-Bogeat, A.; Alexandre-Franco, M.; Fernández-González, C.; Macías-García, A.; Gómez-Serrano, V. Temperature dependence of the electrical conductivity of activated carbons prepared from vine shoots by physical and chemical activation methods. *Microporous Mesoporous Mater.* 2015, 209, 90-98 |
| BiOI thin films at 350° C. | $1.524 \times 10^{-4}$ | Barroso-Bogeat, A.; Alexandre-Franco, M.; Fernández-González, C.; Macías-García, A.; Gómez-Serrano, V. Temperature dependence of the electrical conductivity of activated carbons prepared from vine shoots by physical and chemical activation methods. *Microporous Mesoporous Mater.* 2015, 209, 90-98 |
| C900 | $3.28 \times 10^{-4}$ | Goyal, M. Nonenvironmental industrial applications of activated carbon adsorption. *In Novel Carbon Adsorbents; Elsevier: Amsterdam, The Netherlands,* 2012; pp. 605-638. |
| Cr, N-codoped TiO$_2$ | $3.05 \times 10^{7}$ | Zhi, M.; Xiang, C.; Li, J.; Li, M.; Wu, N. Nanostructured carbon-metal oxide composite electrodes for supercapacitors: A review. *Nanoscale* 2013, 5, 72-88. |
| Bismuth oxide/activated (1:1) | $1.24 \times 10^{-5}$ | Zhang, L.L.; Gu, Y.; Zhao, X. Advanced porous carbon electrodes for electrochemical capacitors. J. Mater. *Chem. A* 2013, 1, 9395-9408 |
| Pure Bi$_2$O$_3$ | $1.55 \times 10^{-7}$ | Huang, Q.; Wang, X.; Li, J.; Dai, C.; Gamboa, S .; Sebastian, P. Nickel hydroxide/activated carbon composite electrodes for electrochemical capacitors. *J. Power Sources* 2007, 164, 425-429 |
| Rice husk activated carb | $8.17 \times 10^{-5}$ | Zhang, L.L.; Gu, Y.; Zhao, X. Advanced porous carbon electrodes for electrochemical capacitors. J. Mater. *Chem. A* 2013, 1, 9395-9408 |
| 8 mmol Bi/CA | $4.91 \times 10^{-3}$ | Zhang, L.L.; Gu, Y.; Zhao, X. Advanced porous carbon electrodes for electrochemical capacitors. J. Mater. *Chem. A* 2013, 1, 9395-9408 |
| Bi/Commercial CA | $0.905 \times 10^{-7}$ | Choi, Y.J.; Choi, J.B.; Im, J.S.; Kim, J.H. Effect of Porosity in Activated Carbon Supports for Silicon-Based Lithium-Ion Batteries (LIBs). *ACS Omega* 2023, 8, 19772-19780 |

TABLE 3-continued

| Comparison of electrical conductivity of 10 C/BiOI nanocomposites with other systems. | | |
|---|---|---|
| Sample | $\sigma_{ac}$ (ohm$^{-1}$ · cm$^{-1}$) | Ref |
| Bi/Rice husk CA | $2.59 \times 10^{-7}$ | Choi, Y.J.; Choi, J.B.; Im, J.S.; Kim, J.H. Effect of Porosity in Activated Carbon Supports for Silicon-Based Lithium-Ion Batteries (LIBs). *ACS Omega* 2023, 8, 19772-19780 |
| Commercial activated carb | $0.741 \times 10^{-7}$ | Choi, Y.J.; Choi, J.B.; Im, J.S.; Kim, J.H. Effect of Porosity in Activated Carbon Supports for Silicon-Based Lithium-Ion Batteries (LIBs). *ACS Omega* 2023, 8, 19772-19780 |
| 10 C/BiOI | $2.86 \times 10^{-4}$ | This work |

In the present disclosure a facile one-pot method was adopted for preparing BiOI, 1C/BiOI, 5C/BiOI, and 10C/BiOI nanomaterials. XRD analysis unraveled the BiOI tetragonal crystal structure in all fabricated products. The electrical characteristics of BiOI, 1C/BiOI, 5C/BiOI, and 10C/BiOI nanocomposites were evaluated. Different frequencies were utilized to measure the dielectric constant and AC electrical conductivity. The proportionality of temperature and frequency and correspondence de and AC electrical conductivity indicated the semiconducting properties for the four synthesized nanomaterials, a phenomenon attributed to the hopping mechanism for all samples except pure BiOI, which shows the quantum mechanical tunneling mechanism depending on the increase in the value of s with increasing temperature. Compared to pure BiOI, the 1C/BiOI, 5C/BiOI, and 10C/BiOI nanocomposites exhibited better AC conductivity, which rose as the AcC increased. Additionally, the dielectric constant $\varepsilon'$ and the dielectric loss $\varepsilon''$ as frequency increased, and the 1C/BiOI, 5C/BiOI, and 10C/BiOI responses were higher than the pure BiOI. The impedance analysis showed that grain boundaries play a major role in the conduction process at high frequencies, specifically for BiOI and 1C/BiOI samples. The electrical characteristics of BiOI, 1C/BiOI, 5C/BiOI, and 10C/BiOI results nominated these facilely synthesized nanomaterials for several electrical applications, such as dielectric absorbers, charge-stored capacitors, and high-frequency microwave devices.

Numerous modifications and variations of the present disclosure are possible in light of the above teachings. It is therefore to be understood that within the scope of the appended claims, the invention may be practiced otherwise than as specifically described herein.

The invention claimed is:

1. A nanocomposite, comprising, relative to total nanocomposite weight:

bismuth oxy-iodide in at least 90 wt. %; and activated carbon in a range of from 1 to 10 wt. %, wherein the bismuth oxy-iodide comprises the iodine in a range of from 27 to 35 wt. %, the bismuth in a range of from 60 to 62 wt. %, and the oxygen in I to 5 wt. % wherein the activated carbon is in a form of particles and/or particulate aggregates having micropores and mesopores, wherein the particles of the activated carbon are substantially spherical such that a distance from an activated carbon particle center of mass to anywhere on the activated carbon particle outer surface varies by less than 30%, wherein the bismuth oxy-iodide in the nanocomposite has tetragonal hollow nanosphere structures, wherein the activated carbon has a surface area in a range of from 500 to 5000 m²/g, wherein the nanocomposite has a crystal size in a range of from 11.7 to 47.9 nm, wherein the nanocomposite has a crystal lattice size in a range of from 0.022 to 0.023 Å, wherein the nanocomposite has a lattice strain in a range of from 0.604 to 0.607 Å, and wherein the nanocomposite comprises no graphene, carbon nanofibers, or nanotubes.

2. The nanocomposite of claim 1, wherein the activated carbon/bismuth oxy-iodide nanocomposite comprises carbon in a range of from 1.2 to 10 wt. %.

3. The nanocomposite of claim 1, wherein the activated carbon/bismuth oxy-iodide nanocomposite comprises carbon in a range of from 1.2 to 1.5 wt. %.

4. The nanocomposite of claim 1, comprising the activated carbon in a range of from 1.0 to 1.69 wt. %.

5. The nanocomposite of claim 1, comprising the activated carbon in a range of from 1.0 to 1.21 wt. %.

6. The nanocomposite of claim 1, comprising the activated carbon in a range of from 1.21 to 1.69 wt. %.

7. The nanocomposite of claim 1, having 1.0 wt. % of activated carbon and a particle size of from 32.2 to 36.7 nm.

8. The nanocomposite of claim 1, having 1.21 wt. % of activated carbon and a particle size of from 11.7 to 29.4 nm.

9. The nanocomposite of claim 1, having 1.69 wt. % of activated carbon and a particle size of from 26.9 to 47.9 nm.

10. The nanocomposite of claim 1, wherein the distance from the activated carbon particle center of mass to anywhere on the activated carbon particle outer surface varies by less than 20%.

11. The nanocomposite of claim 1, wherein the distance from the activated carbon particle center of mass to anywhere on the activated carbon particle outer surface varies by less than 10%.

12. The nanocomposite of claim 1, having a dielectric constant, at ambient temperature, in a range of greater than 8 to 34.55.

13. The nanocomposite of claim 1, comprising at least 98.5 wt. % of the bismuth oxy-iodide.

14. The nanocomposite of claim 1, consisting of the bismuth oxy-iodide and the activated carbon.

15. The nanocomposite of claim 1, wherein the crystal size of the nanocomposite is in a range of from 15.08 to 34.8 nm.

16. A method for producing the nanocomposite of claim 1, the method comprising:

heating a glycol solution comprising $Bi(NO_3)_3 \cdot 5H_2O$ and activated carbon to 100° C.;

heating a glycol solution comprising potassium iodide to 100° C.;

adding the glycol solution comprising $Bi(NO_3)_3 \cdot 5H_2O$ and activated carbon and the glycol solution comprising potassium iodide to a reaction vessel comprising a solvent to form a reaction mixture;

chilling the reaction mixture to ambient temperature; and filtering the reaction mixture to obtain the activated carbon/bismuth oxy-iodide nanocomposite.

17. The method of claim 16, wherein the glycol solution comprises ethylene glycol.

18. The method of claim 16, wherein the concentration of $Bi(NO_3)_3 \cdot 5H_2O$ in the reaction mixture is in a range from 0.05 to 0.25 M.

19. The method of claim 16, wherein the concentration of potassium iodide in the reaction mixture is in a range from 0.05 to 0.25 M.

20. The method of claim 16, wherein the amount of activated carbon in the glycol solution comprising $Bi(NO_3)_3 \cdot 5H_2O$ and activated carbon is greater than or equal to 10% of the amount of $Bi(NO_3)_3 \cdot 5H_2O$ present.

* * * * *